(12) United States Patent
Ikeda et al.

(10) Patent No.: US 7,299,044 B2
(45) Date of Patent: Nov. 20, 2007

(54) MOBILITY MANAGING METHOD AND MOBILE TERMINAL

(75) Inventors: Shinkichi Ikeda, Yokohama (JP); Makoto Funabiki, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/501,564

(22) PCT Filed: Jul. 25, 2003

(86) PCT No.: PCT/IB03/02969

§ 371 (c)(1), (2), (4) Date: Jul. 14, 2004

(87) PCT Pub. No.: WO2004/014027

PCT Pub. Date: Feb. 12, 2004

(65) Prior Publication Data

US 2005/0101321 A1   May 12, 2005

(30) Foreign Application Priority Data

Jul. 30, 2002  (JP) .............................. 2002-221011
Jun. 6, 2003  (JP) .............................. 2003-161808

(51) Int. Cl.
*H04Q 7/20* (2006.01)

(52) U.S. Cl. .................... 455/436; 455/435.1; 455/433; 455/435.2; 370/329; 370/330; 370/331

(58) Field of Classification Search ............. 455/435.1, 455/436, 433, 435.2; 370/328–331
See application file for complete search history.

(56) References Cited

U.S. PATENT DOCUMENTS

| 6,195,705 B1 * | 2/2001 | Leung ......................... 709/245 |
| 6,407,988 B1 | 6/2002 | Hilton et al. |
| 6,496,704 B2 * | 12/2002 | Yuan .......................... 455/466 |
| 6,587,882 B1 * | 7/2003 | Inoue et al. ................. 709/227 |
| 7,116,654 B2 | 10/2006 | Kim |

(Continued)

FOREIGN PATENT DOCUMENTS

CN    1402493 A    3/2003

(Continued)

OTHER PUBLICATIONS

Perkins, C.E., "Mobile Networking Through Mobile IP", IEEE Internet Computing, IEEE Service Center, Piscataway, NJ, US, vol. 2, No. 1, 1998, pp. 58-69.
International Search Report for application No. PCT/IB 03/02969 dated Apr. 2, 2004.

*Primary Examiner*—Lester G. Kincaid
*Assistant Examiner*—Dung Lam
(74) *Attorney, Agent, or Firm*—RatnerPrestia

(57) ABSTRACT

In a mobile communication system using a mobile IP, a mobile terminal determines a main home agent and a main home address. When the mobile terminal moved to a network different in service form, a home address for use on a moved-in domain network is registered as a primary care of address to the main home agent, thereby enabling communications by using the main home address even upon accessed from the other than the belonging domain network. This makes it possible to flexibly cope with an incoming call from the external by the use of a representative home address even on the Internet as a distributed network.

35 Claims, 20 Drawing Sheets

U.S. PATENT DOCUMENTS

2002/0147837 A1* 10/2002 Heller ..................... 709/238
2003/0073439 A1* 4/2003 Wenzel et al. ............. 455/435
2003/0224788 A1* 12/2003 Leung et al. ........... 455/435.1
2004/0203749 A1* 10/2004 Iyer et al. ............... 455/432.1

FOREIGN PATENT DOCUMENTS

| EP | 1058421 A2 * | 6/2000 |
| EP | 1 058 421 A | 12/2000 |
| JP | 2000-004255 A | 1/2000 |
| JP | 2001-308932 A | 11/2001 |
| WO | WO 98 57515 | 12/1998 |
| WO | WO 01 41395 A | 6/2001 |
| WO | WO0141395 A1 * | 6/2001 |

* cited by examiner

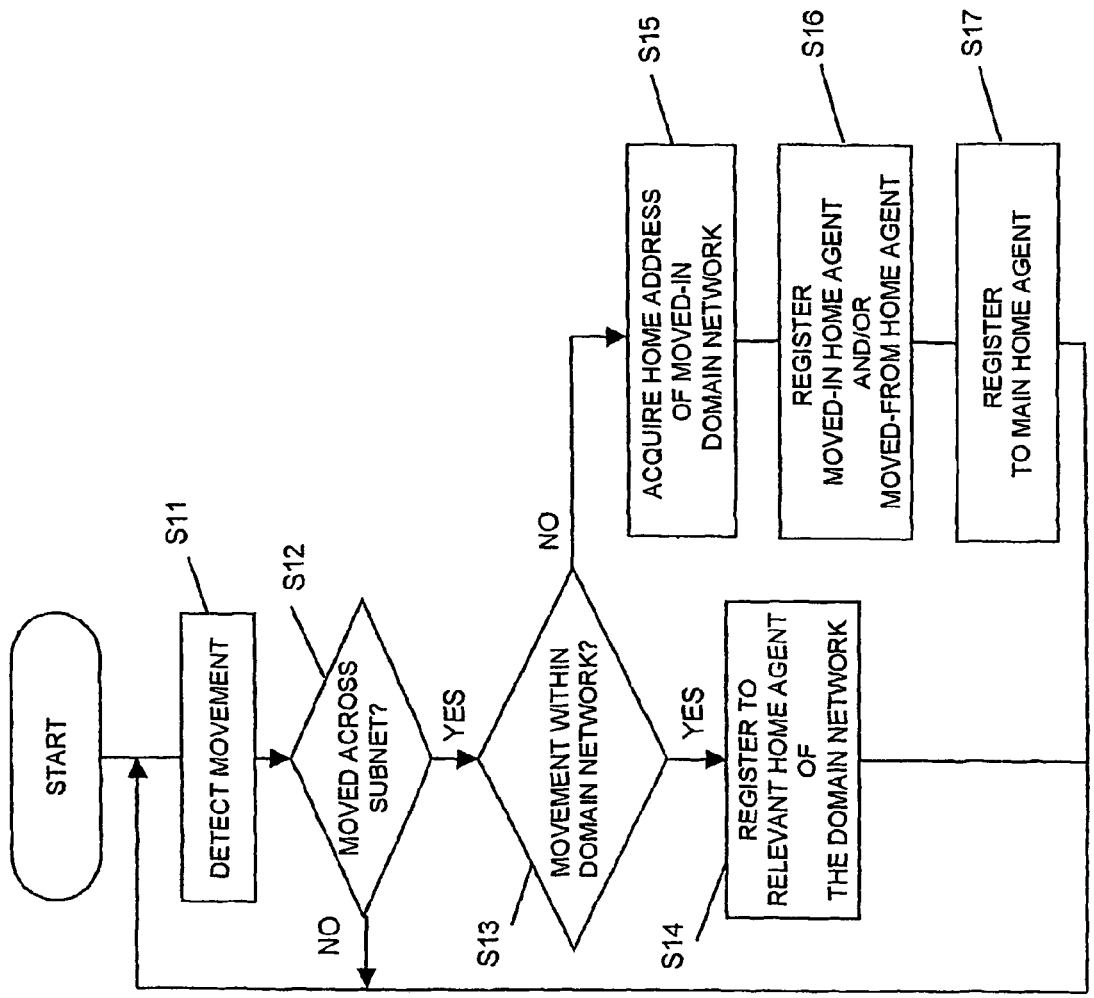

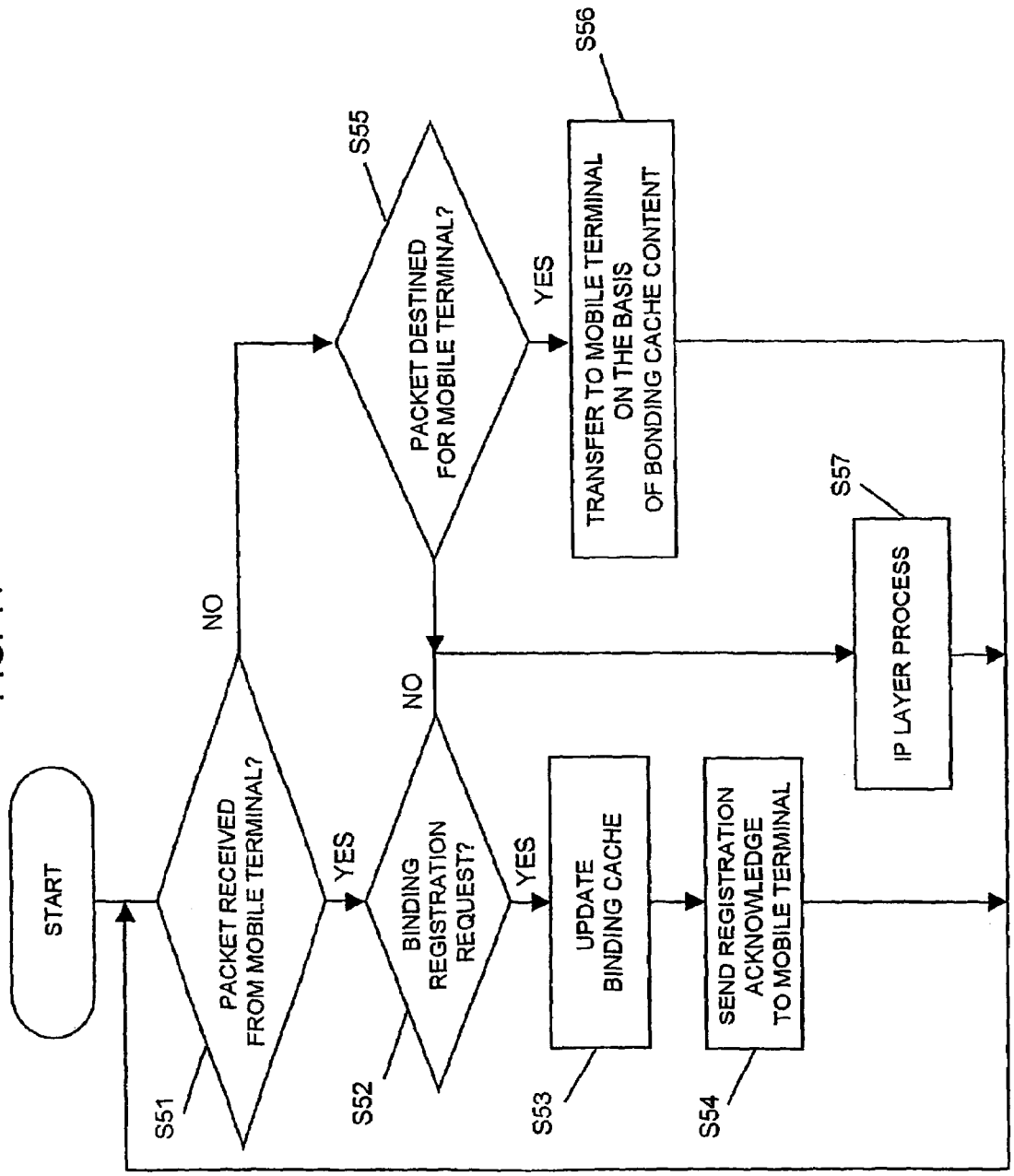

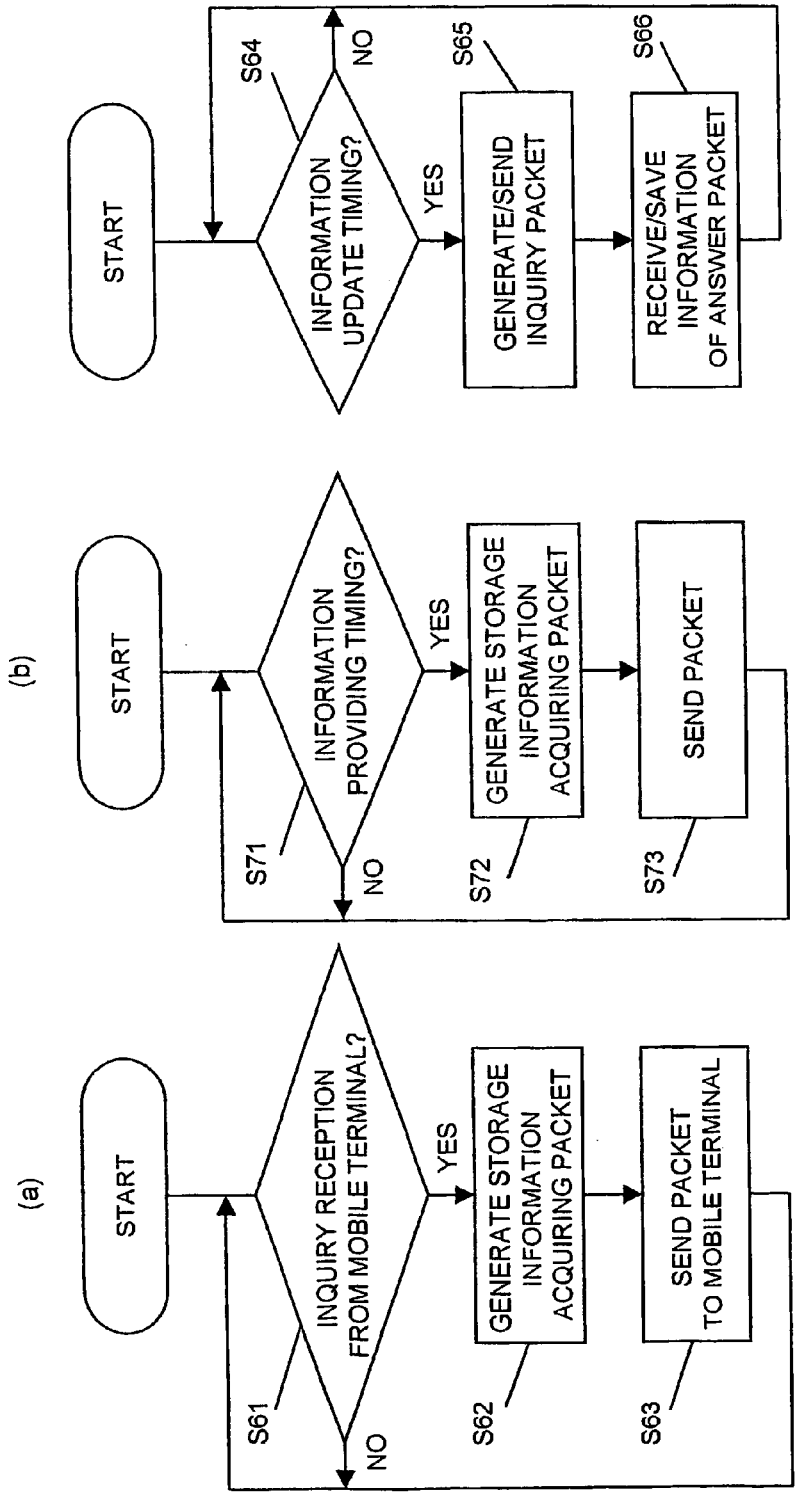

FIG. 15

| IP ADDRESS | PREFERENCE | LIFETIME | HOME PREFIX |
|---|---|---|---|
| Addr_A | 10 | 5Hours | Prefix_A |
| Addr_B | 4 | 5Hours | Prefix_B |
| Addr_C | 7 | 3Hours | Prefix_C |

Figure 18:
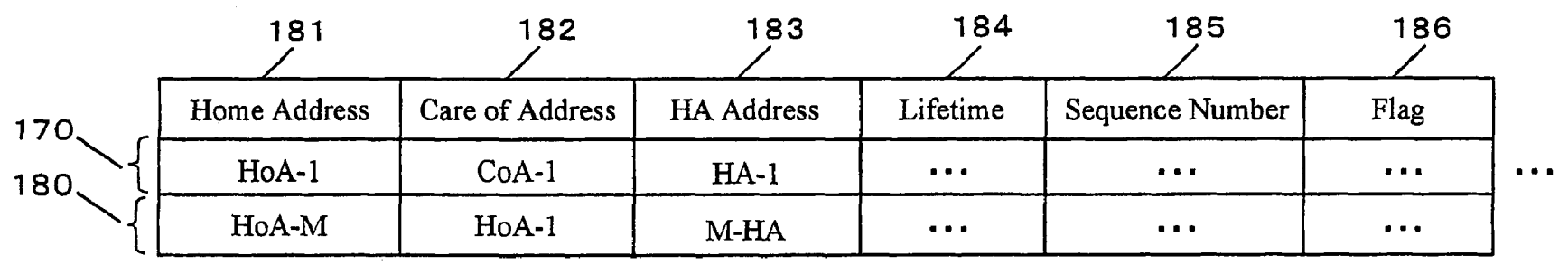

| Home Address | Care of Address | HA Address | Lifetime | Sequence Number | Flag |
|---|---|---|---|---|---|
| HoA-1 | CoA-1 | HA-1 | ... | ... | ... |
| HoA-M | HoA-1 | M-HA | ... | ... | ... |

181  182  183  184  185  186

170  180

MOBILITY MANAGING METHOD AND MOBILE TERMINAL

THIS APPLICATION IS A U.S. NATIONAL PHASE APPLICATION OF PCT INTERNATIONAL APPLICATION PCT/IB2003/002969.

TECHNICAL FIELD

The present invention relates to a mobility managing method and mobile terminal, in a mobile communication system aiming at accessing the Internet, for supporting a change of home address occurring upon roaming of the mobile terminal between the mobile communication networks different in service form, thus allowing communications based on one address notified publicly.

BACKGROUND ART

There is mobile IP as one of mobility managing methods in the Internet system. The mobile IPv4, corresponding to IPv4 (Internet Protocol Version 4), is standardized in RFC3220 (IP Mobility Support). Meanwhile, the mobile IPv6, corresponding to IPv6 (Internet Protocol Version 6), is now under standardization in the Internet draft draft-ietf-mobileip-ipv6 (Mobility Support in IPv6). These protocols enable communications by the use of the same address even where the mobile terminal roams between different networks.

In mobile IPv6, the mobile terminal, where distant from a home link, acquires the prefix information of a currently connected link from the network information sent from an access router of the currently connected link, thereby generating a care of address for use on that link. Thereafter, by sending a binding update message to a home agent, the care of address is registered as a primary care of address to a home agent on a home link of the mobile terminal. The home agent, after receiving the binding update message from the mobile terminal, creates or updates a binding cache to associate the home address and the care of address together.

The home agent makes reference to a binding cache and proxy-receives a packet sent destined for the home address on the home link of the mobile terminal, to encapsulate the proxy-received packet, thereby carrying out a process to transfer it to a care of address of the mobile terminal. The mobile terminal decapsulates the packet transferred by the home agent, thus receiving the packet destined for the home address of the mobile terminal.

Meanwhile, conventionally, as a mobile communication method of this field, there is something like a description in JP-T-2002-503415. FIG. 23 shows the conventional mobile communication method described in that publication.

In FIG. 23, a plurality of mobile communication networks are configured by private automatic branch exchanges (PABXs) 2303, home base stations (HBSs) 2305, digital enhanced cordless telecommunications (DECTs) 2306, and mobile terminals 2304. These mobile communication networks are connected by a mobile subscriber repeater (M-TVSt) 2301. A home data bank (HDB) 2302 acquires and manages a call number of the mobile terminal 2304 for use on each network through the private automatic branch exchange (PABX) 2303 on each mobile communication network, and associates it with a representative number, thereby making it possible to transfer an incoming call from the external.

However, in the mobile communication system using a conventional mobile IP, the mobile terminals and the home agents are in a one-to-one relationship, wherein the home agents are installed/controlled on each domain of mobile communication operator. In such a situation, the mobile terminal when moving between domains is assigned with a different home address by a moved-in domain. In the communications from the external, the external terminal is required to select a home address of accessible mobile terminal, i.e. to know an operator domain to which the mobile terminal is now getting access, which forcibly lowers communication efficiency and convenience.

Meanwhile, it is possible to support a change of home address by using a DNS for managing a correspondence of a host name and address of mobile terminal, particularly a dynamic DNS for dynamic update. However, it generally takes a time of several minutes or more from registration up to stabilizing the DNS system, thus involving many problems in swift responding to mobile terminal roaming.

Incidentally, in the foregoing publication, in a closed communication network for a mobile communication network such as GSM, association is provided by the home data bank (HDB) 2302 and the private automatic branch exchange (PABX) 2303 on each communication network. However, there is a problem of deficient flexibility in the Internet that is a freely distributed network including those mobile communication networks.

DISCLOSURE OF THE INVENTION

In a mobile communication system using a mobile IP, a mobile terminal determines a main home agent and a main home address. When the mobile terminal moves to a network different in service form, a home address (sub-home address) for use on a domain network which is different in service form (i.e., moved-in network domain) is registered as a primary care of address to the main home agent. When accessed externally, by using the main home address, even when the mobile terminal roams between domain networks and is assigned a different home address, external communication is available by using the main home address. Also, where DNS is used to register the main home address to eliminate the necessity of each registration of a local home address (sub-home address) change caused by roaming between domain networks, it is possible to cope with swift movement of the mobile terminal.

A method of managing mobility according to the present invention includes determining a home agent for a mobile terminal to perform location management of the mobile terminal, the mobile terminal having communications with an access point apparatus arranged on a subnet and moving between the subnets and domain networks different in service form, registering a main home address by the mobile terminal provided from a main home agent apparatus to a server for managing a name and an address of an apparatus to have a connection to the at least one domain network; and registering a sub-home address to the main home agent apparatus, as a care of address, for use on another domain network different in service form, when the mobile terminal moves to the other domain network different in service form.

Due to this, even when the mobile terminal moves between domain networks, access is possible to the mobile terminal from an external by using always the same address, i.e. main home address. It is possible to dissolve the confusion caused, as in the conventional, where the home address is changed upon roaming between domain networks. Consistent mobile communications can be realized.

Also, in a method of managing mobility according to the invention, the mobile terminal previously stores information about a home agent apparatus to become a candidate for the main home agent apparatus.

Due to this, the mobile terminal, if previously acquires information about a main home agent, such as an IP address, and a main home address, can realize a swift location registering process in a destination of movement.

Also, a method of managing mobility according to the invention further comprises a step for the mobile terminal to acquire the information about a home agent apparatus to become a candidate for the main home agent apparatus from the domain network.

Due to this, because the information required on a moved-in domain network only is acquired each time, the mobile terminal can be suppressed in memory consumption.

Also, in the method of managing mobility according to the invention, in the home agent determining step, the mobile terminal changes over, as required, the main home agent apparatus from the information about a home agent apparatus.

This makes it possible to cope with a failure of the home agent or flexibly cope with a load distribution measure in the home agent.

Also, in a method of managing mobility according to the invention, in the home agent determining step, the mobile terminal determines the main home agent apparatus from the information about a home agent apparatus, on the basis of a preference as one of the information.

This makes it possible to predict a load over the network or home agent, to secure a superiority in network management.

Also, in a method of managing mobility according to the invention, in the home agent determining step, the mobile terminal determines the main home agent apparatus from the information about a home agent apparatus, on the basis of an access frequency to the home agent apparatus.

This makes it possible to select a main home agent suited for a mobility characteristic of the mobile terminal. Particularly, transmission delay can be reduced during registering a location, achieving to improve the process efficiency.

Also, a method of managing mobility according to the invention further comprises a registration request step of making a request for a registration to the home agent apparatus arranged in a domain network to be connected through a link layer, placed in an effective state at an opportunity of capable of acquiring an IP address, of link layers possessed by the mobile terminal at least one of which turns from a non-effective state into an effective state, wherein, the sub-home address registering step is carried out when the registration request is granted by the sub-home agent apparatus.

This can realize a mobility detecting process in brief time as compared to the case of mobility detection to detect an IP address change.

A mobile terminal according to the invention comprises: a main home agent selecting section for selecting a main home agent apparatus to ask location management and making a request for registering a main home address given from the main home agent apparatus to a server for managing an address of an apparatus to be connected to the domain network; a mobile IP processing section for notifying, when moved to a domain network different in service form, a sub-home agent apparatus for asking location management on a moved-in domain network of a sub-home address for use on the moved-in domain network together with a care of address for use on a subnet of within the moved-in domain network, on the basis of a mobile IP protocol; and a home agent registering section for notifying the main home agent apparatus of the main home address and a sub-home address for use on the moved-in domain network.

Due to this, even when the mobile terminal moves between domain networks, access is possible to the mobile terminal from an external by using always the same address, i.e. main home address. It is possible to dissolve the confusion caused, as in the conventional, where the home address is changed upon roaming between domain networks. Consistent mobile communications can be realized.

Also, a mobile terminal according to the invention further comprises a home domain storing section for storing a home agent list as information about a home agent apparatus to become a candidate for the main home agent apparatus, wherein the main home agent selecting section selects a main home agent apparatus from the home agent list.

Due to this, the mobile terminal, if previously acquires information about a main home agent, such as an IP address, and a main home address, can realize a swift location registering process in a destination of movement.

Also, in a mobile terminal according to the invention, the main home agent selecting section acquires information about a home agent apparatus from the domain network and store it to the home domain storing section.

Due to this, because the information required on a moved-in domain network only is acquired each time, the mobile terminal can be suppressed in memory consumption.

Also, in a mobile terminal according to the invention, the main home agent selecting section changes over, as required, the main home agent apparatus from the home agent list stored in the home domain storing section.

Due to this, by selecting or reselecting a main home agent as required, it is possible to cope with a failure of the home agent or flexibly cope with a load distribution measure in the home agent.

Also, in a mobile terminal according to the invention, the main home agent selecting section selects the main home agent apparatus from the home agent list stored in the home domain storing means, on the basis of a preference as one of information about a home agent apparatus.

This makes it possible to predict a load over the network or home agent, to secure a superiority in network management.

Also, in a mobile terminal according to the invention, the main home agent selecting section selects as the main home agent apparatus a home agent apparatus having an access frequency equal to or greater than a predetermined value from the home agent list stored in the home domain storing section.

This makes it possible to select a home agent suited for a mobility characteristic of the mobile terminal. Particularly, transmission delay can be reduced during registering a location, achieving to improve the process efficiency.

Also, in a mobile terminal according to the invention, the home agent registering section makes a request for registration to a sub-home agent apparatus through a link layer turned from a non-effective state into an effective state so that, when receiving a grant for the registration request by the sub-home agent apparatus, started is a notification of a sub-home address to the main home agent apparatus.

This can realize a moving detecting process in brief time as compared to the case of movement detection to detect an IP address change.

Also, in a mobile terminal according to the invention, the mobile IP processing section, when receiving a multi-encapsulated packet, takes a source address described in an innermost header as a destination of registering location.

This eliminates the possibility to duplicatedly register the address of an already recorded home agent apparatus or access point apparatus, preventing the useless consumption of resources of the mobile terminal and the home agent apparatus.

As described above, according to the invention, even in the case of roaming between the mobile communication terminals different in service form, incoming calls from the external can be secured by the use of a representative home address.

BRIEF DESCRIPTION OF THE DRAWINGS

FIG. 10 is a flowchart showing the operation of the mobile terminal according to embodiment 1 of the invention.

FIG. 11 is a flowchart showing an operation of the home agent apparatus according to embodiment 1 of the invention.

FIG. 12(*a*) is a flowchart showing an information providing operation of the access point apparatus according to embodiment 1 of the invention.

FIG. 12(*b*) is a flowchart showing an information providing operation of the access point apparatus according to embodiment 1 of the invention.

FIG. 13 is a flowchart showing an information providing operation of the access point apparatus according to embodiment 1 of the invention.

FIG. 15 is a figure showing an example of a home agent list according to embodiment 1 of the invention.

FIG. 17(*b*) is a figure showing an example of a binding cache to be managed by the home agent apparatus according to embodiment 1 of the invention.

FIG. 18 is a figure showing an example of a binding update list to be managed by a mobile terminal apparatus according to embodiment 1 of the invention.

BEST MODE FOR CARRYING OUT THE INVENTION

Hereunder, embodiments of the present invention will be explained with using the drawings. Note that the same constituent elements are shown by attaching the same references.

Embodiment 1

Embodiment 1 of the invention is explained with using FIGS. 1 to 22.

Figure 1:
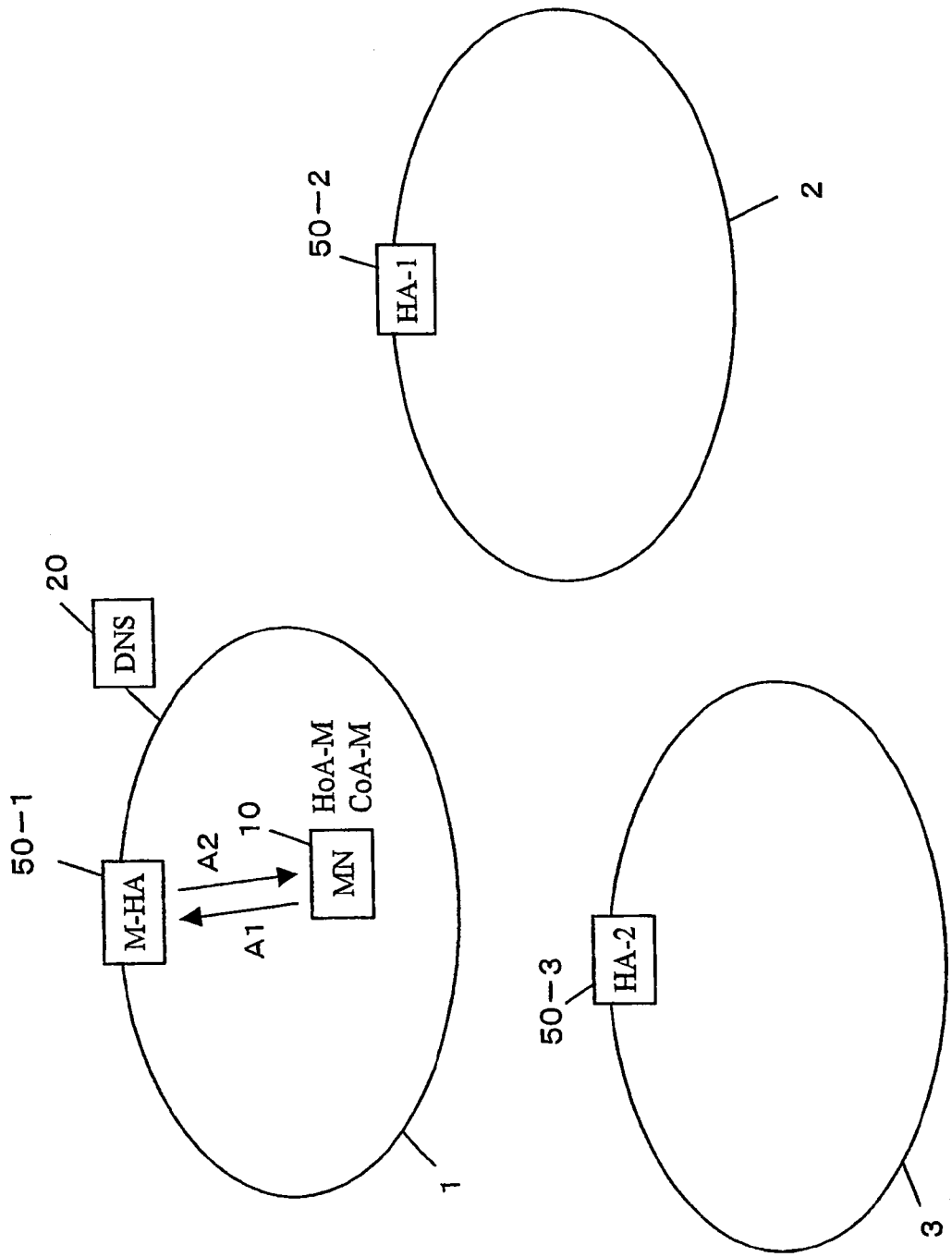
FIG. 1 is a diagram showing a network configuration of a mobile communication system according to embodiment 1 of the invention.
Figure 2:
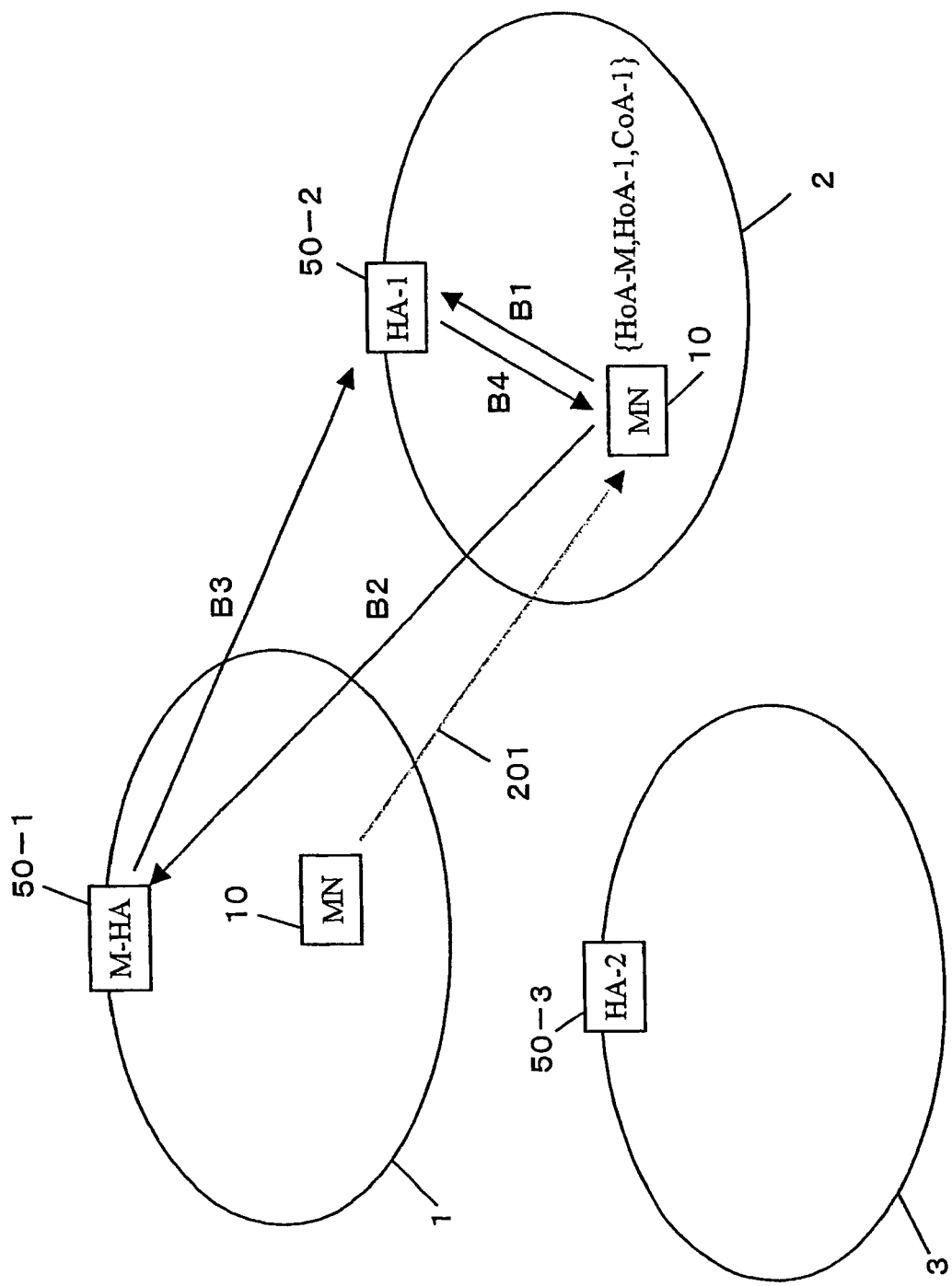
FIG. 2 is a diagram showing a network configuration of the mobile communication system according to embodiment 1 of the invention.
Figure 3:
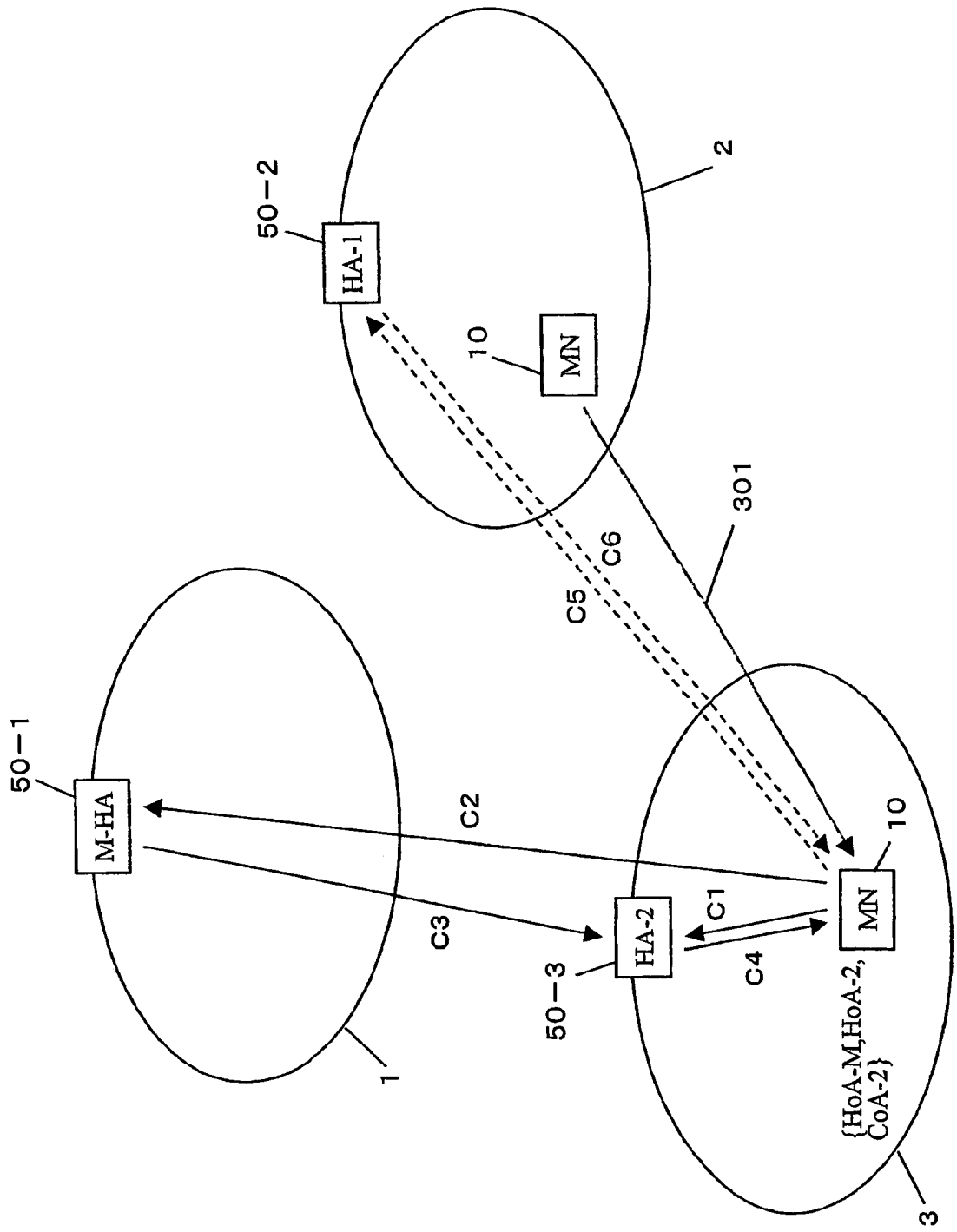
FIG. 3 is a diagram showing a network configuration of the mobile communication system according to embodiment 1 of the invention.

FIGS. 1 to 3 and 14 are diagrams showing a network configuration of a mobile communication system according to the invention. In FIGS. 1 to 3, domain networks 1, 2, 3 are the domain networks having different forms in services. Particularly, the domain network 1 is a home domain network selected and determined by a mobile terminal (MN) 10 while the domain networks 2, 3 are external domain networks. Home agent apparatuses (HA) 50-1, 50-2, 50-3 are respectively to manage the domain networks 1, 9, 3. Particularly, the home agent apparatus 50-1 is a main home agent apparatus (M-HA) to manage the home domain network for the mobile terminal 10. Meanwhile, home agent apparatuses 50-2, 50-3 are sub-home agent apparatuses (HA-1, HA-2) arranged in the other domain networks than the home domain network. Meanwhile, a domain network system (DNS) server 20 is to associate a host name with an IP address on the Internet, which manages, associatedly, an IP address and host name of the home agent apparatus 50-1 or mobile terminal 10 belonging to the domain network 1 and may define the domain networks 2, 3 as external domain networks and further have a function to define the home agent apparatus in an external domain network as sub-home agent apparatuses 50-2, 50-3.

Figure 14:
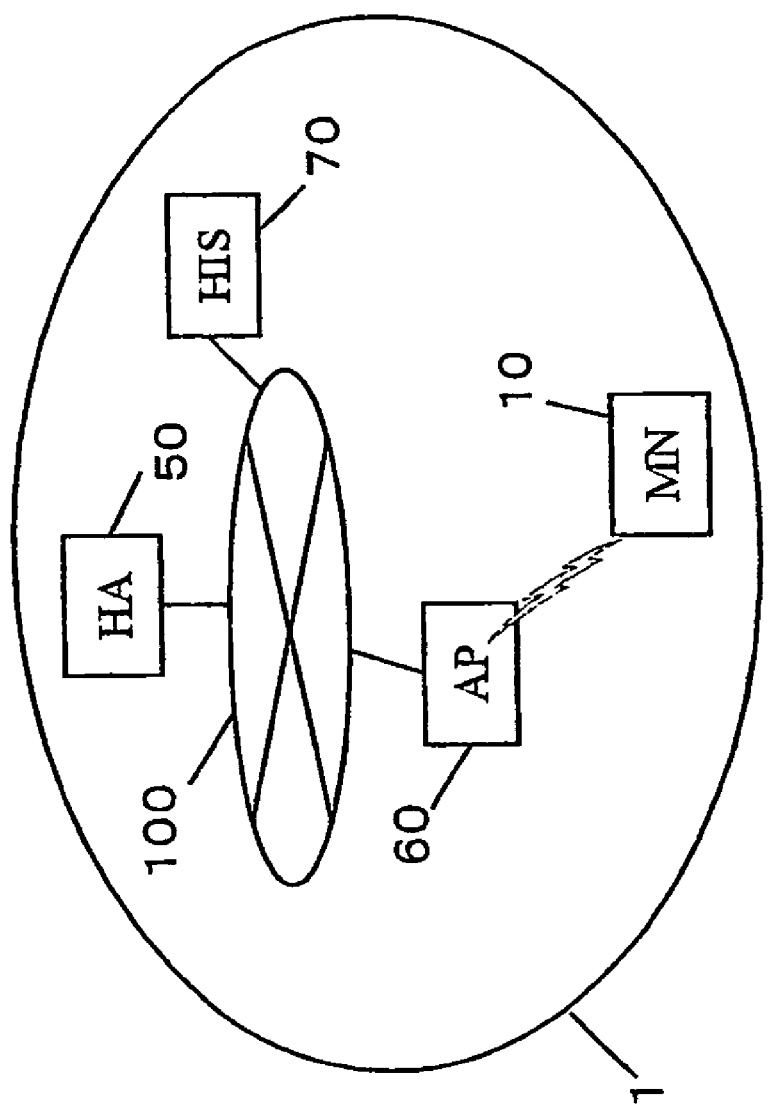
FIG. 14 is a diagram showing a domain network configuration according to embodiment 1 of the invention.

Furthermore, each of the respective domain networks 1, 2, 3 has a configuration shown in FIG. 14.

In FIG. 14, an access point apparatus (AP) 60, although to radio-communicate with the mobile terminal 10, may perform communications by the use of a wired line without limited to that. The invention is not to limit the same. Meanwhile, a local network 100 is a sub-network laid down within the domain network.

Furthermore, a home-agent information providing server (HIS) 70 has a function to provide the mobile terminal 10 with information about the home-agent apparatus 50 placed on the domain network 1.

The method of managing mobility over the mobile communication system configured as above is explained in respect of its operation and function.

In the outset, the mobile terminal 10 designates a domain network 1, as a home domain network 1, from the plurality of domain networks 1, 2, 3, and selects a home agent apparatus 50-1 as a main home agent to manage the address of the mobile terminal 10.

Then, the home agent apparatus 50-1 assigns a home address usable on the domain network to the mobile terminal 10. The assigned home address is defined as a main home address to a binding cache.

Meanwhile, the mobile terminal 10 makes a request for registering the main home address to the DNS 20. Receiving the request, the DNS 20 registers, associatedly, a name and home address of the mobile terminal 10 being requested.

Now explained is a case that the mobile terminal 10 roams within the home domain network 1 (movement from subnet to subnet).

In the outset, the mobile terminal 10, in a subnet newly moved in, includes at least a care of address CoA-M and a main home address HoA-M, to packet-transmit a registration request message complying with a mobile-IP procedure to the main home agent apparatus 50-1.

Then, the main home agent apparatus 50-1, when receiving an effective registration request message (A1), updates an entry content corresponding to the mobile terminal 10 in its own binding cache and packet-transmits a registration acknowledge message back to the mobile terminal 10 (A2).

From then on, the data packet destined for the home address HoA-M of mobile terminal 10 is tunnel-transferred (A2) to the care of address CoA-M of mobile terminal 10 registered in the binding cache by the main home agent apparatus 50-1, thereby being correctly transferred to the mobile terminal 10.

Now explained is an operation at the time that the mobile terminal 10 exits the home domain network 1 and moved (201) into an external domain network 2 under the jurisdiction of a sub-home agent apparatus 50-2, by using FIG. 2.

First, the mobile terminal 10 accesses a subnet within the external domain network 2, and generates a care-of-address CoA-1 on the basis of the network information of the subnet moved in. The network information is to be delivered, for example, by a router advertisement packet. The mobile terminal 10, if recognizing a fact that the accessed domain network 2 is not a home domain network 1, acquires a sub-home address HoA-1. This sub-home address corresponds to a sub-home address.

Incidentally, the care of address CoA-1 may be generated from network information by the mobile terminal 10 or may be through receiving an assignment from a network by the use of a protocol such as DHCP (Dynamic Host Configuration Protocol).

Acquiring a sub-home address HoA-1 may be on the basis of the information acquired from an access point apparatus 60 connected or on the basis of the information acquired from the home agent information providing server 70 connected to the network. Specifically, the mobile terminal 10 sends an inquiry packet to the access point apparatus 60 or home agent information providing server 70, and the access point apparatus 60 or home agent information providing server 70 in turn sends back to the mobile terminal 10 an acknowledge packet including a content of a home agent list as shown in FIG. 15. Otherwise, the mobile terminal 10 receives and utilizes a data packet including a content of a home agent list broadcast or multicast at a regular interval by the access point apparatus 60 or home agent information providing server 70. Herein, explained below is the information about the home agent apparatus shown in FIG. 15.

IP address 141 is an address of the home agent apparatus. Preference 142 is a priority suitable in selection as determined from the remaining resource or load condition of the home agent apparatus. Lifetime 143 is a remaining operating time of the home agent apparatus 50. Home prefix 144 shows a list of the home prefixes the home agent apparatus 50 is to manage. Meanwhile, in the case that a home address is assigned to the mobile terminal 10, an assigned home address may be described.

Such information to be acquired by a mobile terminal 10 is information having a content corresponding to the home agent list, without exception. Specifically, information about the home agent apparatus 50 is to be acquired. The mobile terminal 10 selects one home agent apparatus 50 by any of the methods of selection on the basis of the priority 142, selection of the highest one in the list or selection at random.

As shown in FIG. 15, in the case that home prefix information is included in the home agent list, a home address HoA-1 may be generated and acquired on the basis of a relevant home prefix. Home prefix information is an addition by the invention to the description items of the home agent list as defined by the conventional mobile IP protocol. One or more home prefixes to be managed by each home agent are described in the home prefix column of the home agent list.

Incidentally, this method is not limited to but the mobile terminal 10 may use a mobile prefix solicitation/advertisement scheme or dynamic home agent address discovery protocol based on the mobile IP protocol thereby acquiring a home agent list and generating/acquiring a home address HoA-1.

Then, the mobile terminal 10 registers a newly acquired care of address CoA-1, together with a sub-home address HoA-1, to the home agent apparatus 50-2 (B1). Furthermore, the mobile terminal 10 registers the sub-home address HoA-1, as a primary care of address, together with a main home address HoA-M to the main home agent apparatus 50-1 (B2).

Then, the main home agent apparatus 50-1 and sub-home agent apparatus 50-2, when receiving from the mobile terminal 10 a packet including a registration request message by the same procedure as roaming from subnet to subnet, updates a binding cache in itself and sends a packet including a registration acknowledge message to the mobile terminal 10.

From then on, the packet of mobile terminal 10 destined for the main home address HoA-M is first proxy-received by the main home agent apparatus 50-1. The main home agent apparatus 50-1, as a result of making reference to the binding cache in itself, transfers it to the sub-home address HoA-1 registered as a care of address CoA (B3).

The packet destined for the sub-home address HoA-1 is proxy-received by the sub-home agent apparatus (HA-1) 50-2. The sub-home agent apparatus 50-2, as a result of making reference to the binding cache in itself, transfers it to the care of address CoA-1 (B4), and finally to the mobile terminal 10 in the domain network 2 correctly.

Figure 19:
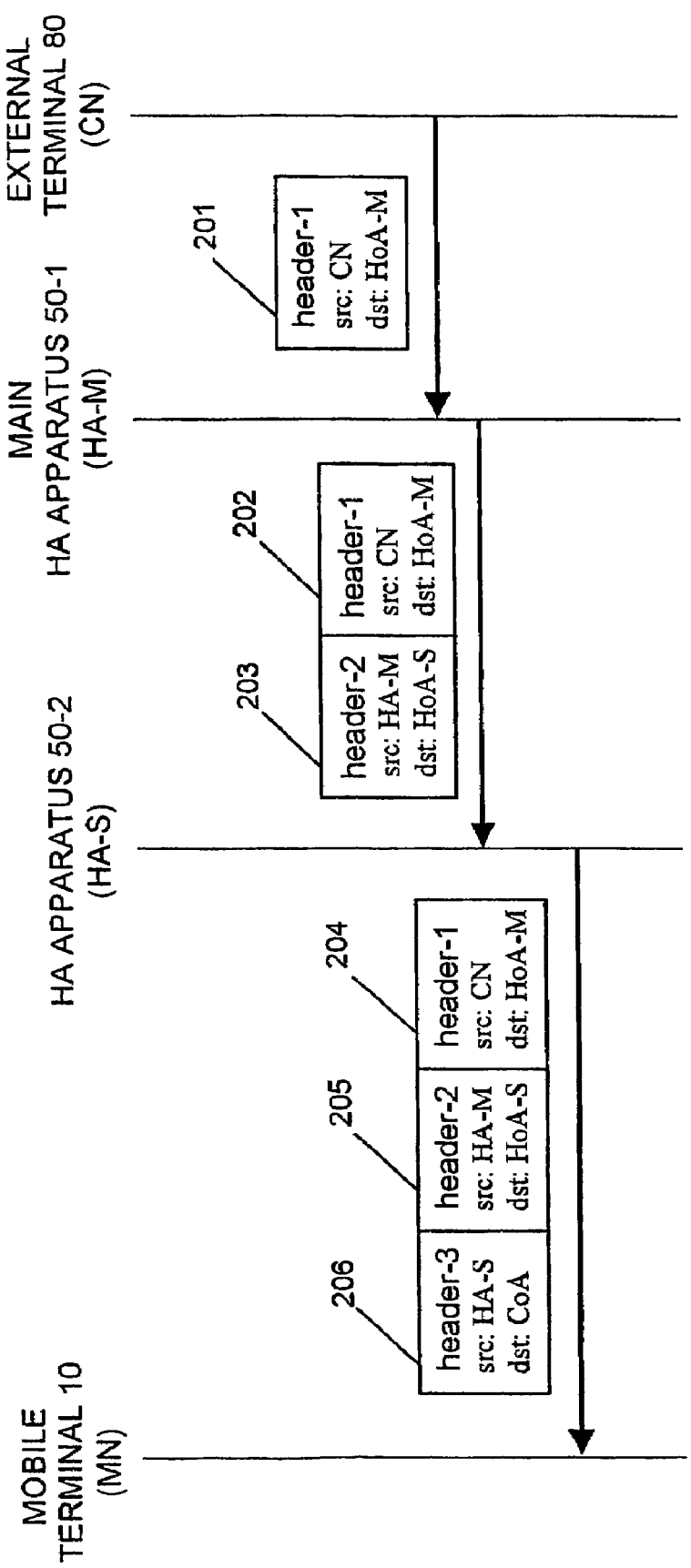
FIG. 19 is a diagram showing a packet flow from an external terminal according to embodiment 1 of the invention.

The packet transfer form in the duration is explained below, by using FIG. 19.

In the outset, the packet of mobile terminal 10 destined for a main home address HoA-M (given with a header 1 (201)), sent by an external terminal (CN) 80, is proxy-received by the main home agent apparatus 50-1 and tunnel-transferred to a home address HoA-S in the present domain registered in the binding cache. At this time, a header 2 (203) is provided.

Then, the tunnel-transferred packet is proxy-received to the sub-home agent apparatus 50-2 in the present domain and tunnel-transferred destined for a CoA of the mobile terminal 10. At this time, a header 3 (206) is further provided.

Then, the mobile terminal 10 receives the doubly encapsulated transfer packet, and recognizes the source address described in the innermost header 1 (204) as the one of an external terminal CN. A request for registration process is made to the main home agent apparatus, as required. As for the addresses obtained from the other header 2 (205) and header 3 (206), no registration request is made because they have already been registered. This can suppress resource spending in the mobile terminal 10 and home agent apparatus 50.

Incidentally, in the case the mobile terminal 10 roams within the external domain network 2 (roaming from subnet to subnet), a registration request message is sent only to the sub-home agent apparatus 50-2. From then on, in roaming within the external domain network, a request for registration is made only to the home agent apparatus for managing that domain.

Next, explanation is made on the operation at a time that the mobile terminal 10 exits the external domain network 2 and moved (301) to the external domain network 3 that is under the jurisdiction of the home agent 50-3.

In the outset, the mobile terminal 10 accesses a subnet of within the external domain network 3, and generates a care of address CoA-2 on the basis of the network information of the subnet moved in. Meanwhile, the mobile terminal 10, if recognizing a fact that the accessed external domain network 3 is not a home domain network 1 nor an external domain network 2 it so far belonged, acquires a sub-home address HoA-2.

Incidentally, the care of address CoA-2 may be generated from network information by the mobile terminal 10 similarly to the movement to the domain network 2, or may be through receiving an assignment from the network by the use of a protocol such as DHCP (dynamic host configuration protocol).

Also, the sub-home address HoA-2 can be acquired by a similar method to that of obtaining in the domain network 2.

Then, the mobile terminal 10 registers the newly acquired care of address CoA-2 together with the sub-home address HoA-2, to the sub-home agent apparatus 50-3 (C1). Furthermore, the mobile terminal 10 registers the sub-home address HoA-2 as a primary care of address, together with the main home address HoA-M to the main home agent apparatus 50-1 (C2). The main home agent apparatus 50-1 and sub-home agent apparatus 50-3, if receiving a packet including a registration request message from the mobile terminal 10 by the same procedure as the movement to the domain network 2, updates the binding cache in itself and sends a packet including a registration acknowledge message to the mobile terminal 10.

From then on, the packet of mobile terminal 10 destined for the home address HoA-M is first proxy-received by the main home agent apparatus 50-1 and then transferred destined for the sub-home address HoA-2 registered as a care of address CoA (C3), similarly to the movement to the domain network 2. After being proxy-received by the sub-home agent apparatus 50-3, this is transferred destined for the care of address CoA-2 (C4), and finally, correctly transferred to the mobile terminal 10.

Meanwhile, the mobile terminal 10, at a time recognizing a fact that not the external domain network 2 it so far belonged, sends a packet including a registration request message whose lifetime is zero, defined under the mobile IP protocol to the sub-home agent apparatus 50-2 of the external domain network 2 belonged before, thus making a request for deleting an entry corresponding to the mobile terminal 10 in the binding cache being managed by the sub-home agent apparatus 50-2. Otherwise, similarly to the registration to the main home agent apparatus 50-1, a set of sub-home address HoA-1 as home address and sub-home address HoA-2 as primary care of address is registered also to the sub-home agent apparatus 50-2 (C5). This makes it possible to transfer, to the mobile terminal 10 without exceptions, the packets of mobile terminal 10 destined for sub-home address HoA-1 arrived differently in time at the sub-home agent apparatus 50-2 (C6).

Meanwhile, in every movement, it is possible to register a care of address effective in a subnet to access according to the mobile IP protocol regulation (e.g. CoA-1, CoA-2) as a care of address CoA to the main home agent apparatus 50-1 or, as required, to the sub-home agent apparatus (sub-home agent apparatus 50-2 in the above example) belonged before. However, in such a case, efficiency is not good because a registration to the home agent apparatus 50 occurs whenever moving from the subnet. Accordingly, as in this embodiment, it is desired to register a home address (e.g. HoA-1, HoA-2) effective on the currently-belonging domain network as a primary care of address to the main home agent apparatus 50-1.

Next, the configuration of each apparatus and its operation is explained by using figures.

First explained is a configuration and basic operation of the mobile terminal 10.

Figure 4:
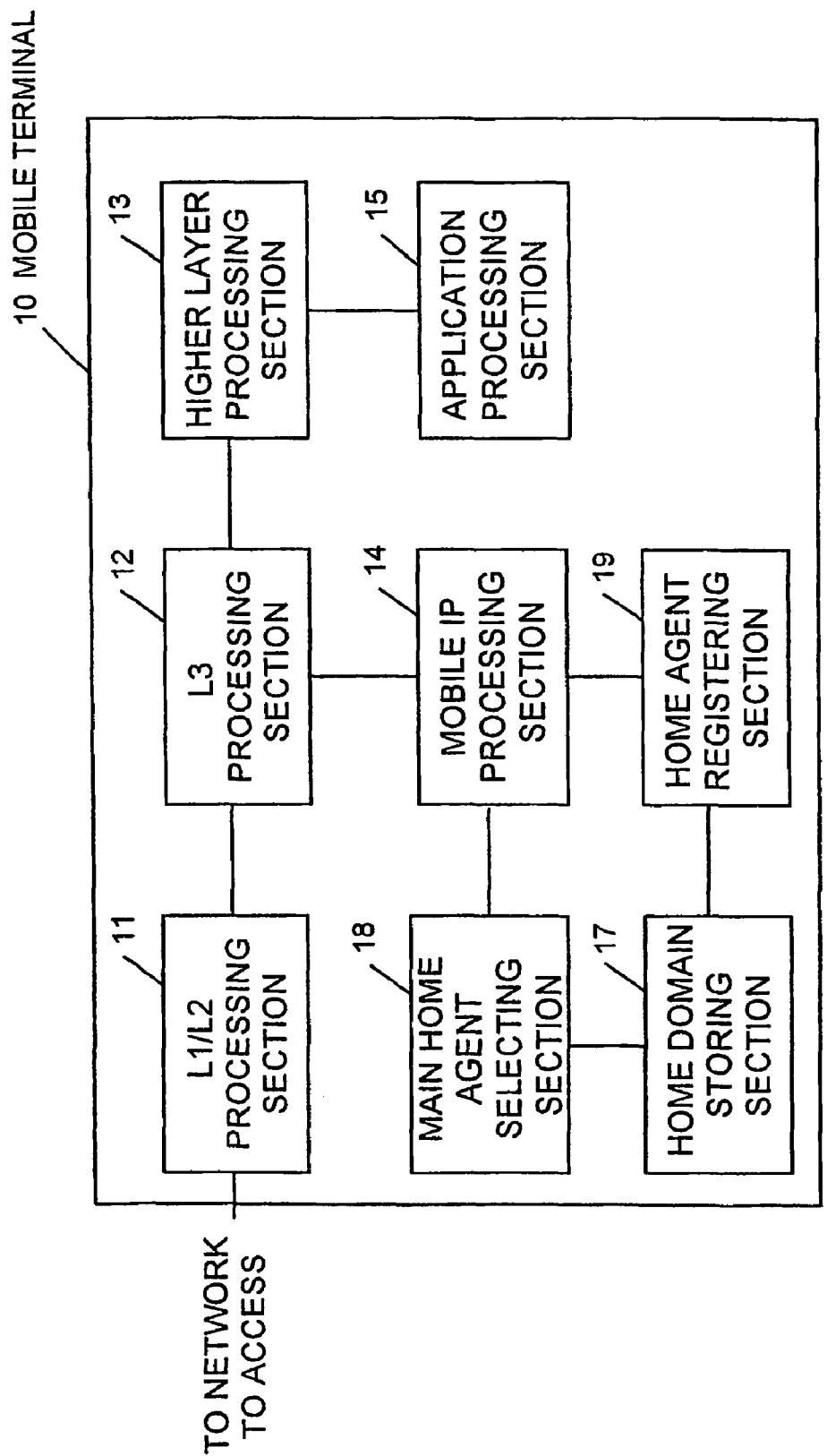
FIG. 4 is a diagram showing a first configuration of a mobile terminal according to embodiment 1 of the invention.
Figure 5:
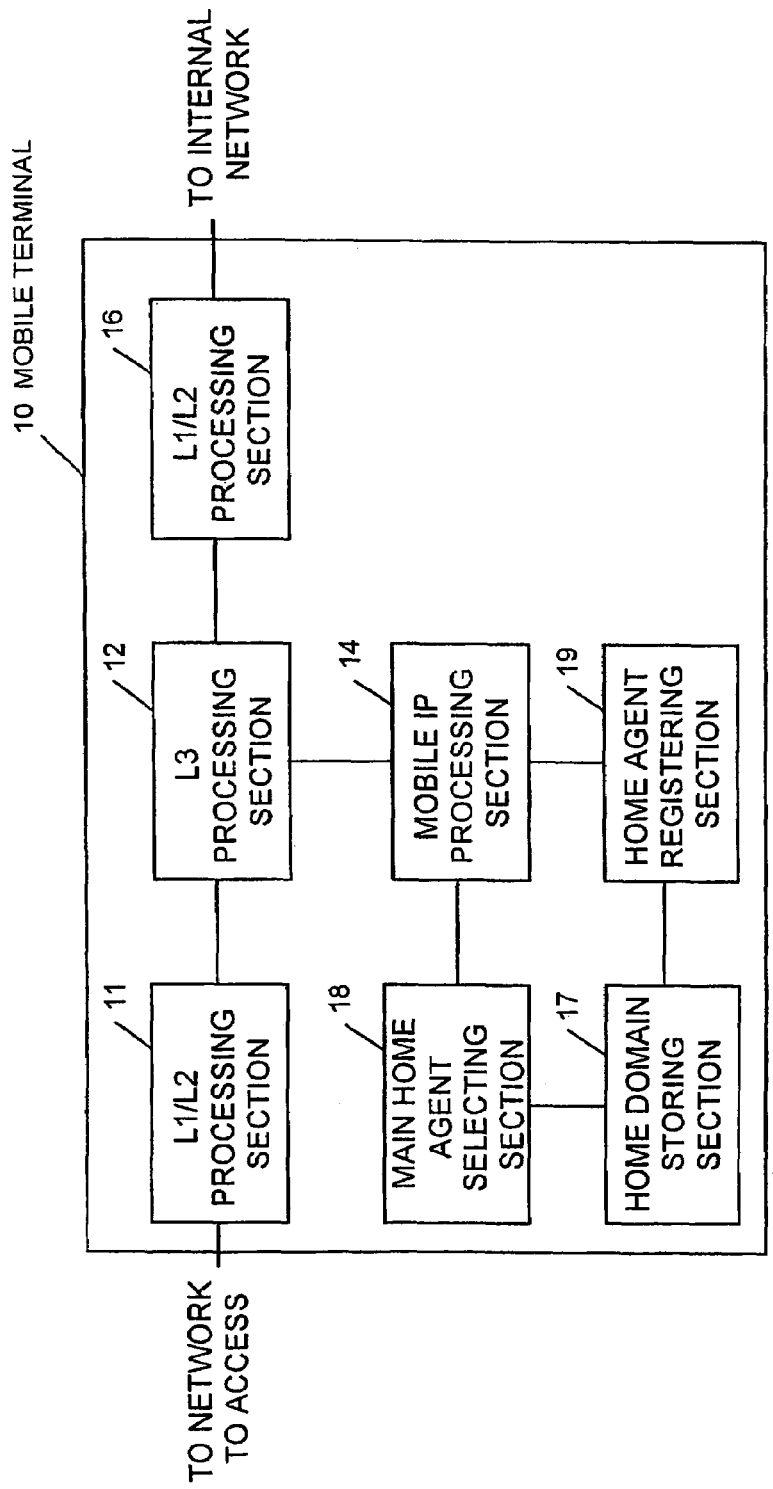
FIG. 5 is a diagram showing a second configuration of a mobile terminal according to embodiment 1 of the invention.

FIG. 4 is a block diagram showing a configuration of the mobile terminal 10 in the case the mobile terminal 10 functions as a host. FIG. 5 is a block diagram showing a configuration of the mobile terminal 10 in the case the mobile terminal 10 functions as a router.

In FIGS. 4 and 5, an L1/L2 processing section 11, 16 is for communication-processing a physical layer and data-link layer, an L3 processing section 12 is for communication-processing a network layer, a higher-layer processing section 13 is for processing a higher layer such as TCP, UDP or the like, a mobile IP processing section 14 is for managing the mobility of mobile terminal on the basis of the mobile IP protocol, an application processing section 15 is for controlling the applications, a home-domain storing section 17 is for storing the information about the main home agent apparatus or home domain network and main home address, a main home agent selecting section 18 is for selecting a main home agent apparatus 50 and makes a request for registering a main home address to a DNS 20, and a home agent registering section 19 is for making a registration request of a destination home address (sub-home address) to the main home agent apparatus 50.

Incidentally, although FIG. 5 shows only two L1/L2 processing sections 11, 16 for connection to a network, the configuration may comprise much more L1/L2 processing sections, the invention being not to limit the provision number. Even where three or more L1/L2 processing sections are provided, the operation thereof can be realized by the similar configuration and the below explained procedure.

The basic operation of the mobile terminal 10 configured as above is explained below.

The sending operation by the mobile terminal 10 configured shown in FIG. 4 is as follows.

The transmission data generated by the application processing section 15 is transferred to the L3 processing section 12 for IP protocol processing by way of the higher-layer processing section 13 for processing according to a socket or protocol of TCP, UDP or the like. Thereafter, the L3 processing section carries out an IP process, simultaneously with which the mobile IP processing section 14 carries out an additional IP header process concerning the mobile IP. The transmission data undergone these processes is subjected to a data-link protocol process and physical-layer protocol process in the L1/L2 processing section 11, and thereafter sent onto the network under access (hereinafter, referred to as "access network").

The receiving operation by the mobile terminal 10 having a host function shown in FIG. 4 is reverse in operation to the sending operation, as follows.

Namely, the L1/L2 processing section 11 receives a packet from the access network and carries out physical-layer protocol and data-link protocol processes. Thereafter, the L3 processing section carries out an IP protocol process, simultaneously with which the mobile. IP processing section 14 carries out an additional IP header process concerning the mobile IP. Subsequently, the higher-layer processing section 13 processes a higher layer and then transfers data to the application processing section 15.

Next, the operation of the mobile terminal having a router function shown in FIG. 5 is explained below.

In the outset, the L1/L2 processing section 16 carries out a physical-layer protocol process and data-link protocol process on a packet received from an internal network (hereinafter, referred to as "internal network"). Thereafter, the L3 processing section carries out an IP protocol process including a routing process, and transfers it to either of the L1/L2 processing section 11 or the L1/L2 processing section 16. The packet the L1/L2 processing section 11 received from the access network is transferred to either of the L1/L2 processing section 11 or the L1/L2 processing section 16 as a result of a routing process in the L3 processing section 12. Herein, the mobile IP processing section 14 carries out also a standard mobile router process that is an application of mobile IP protocol, in order to provide transparency of its movement to internal network.

In roaming of the mobile terminal 10, there are shown different movements between the movement across the subnets within the same domain network and the movement between different domain networks. The both are common in that the care of address CoA acquired after movement is registered together with a home address HoA to the home agent apparatus 50 of the belonging domain network.

First explained is an operation that the mobile terminal 10 makes a movement across the subnets within the same domain network 1, by using FIGS. 1 and 10. FIG. 10 is a flowchart showing a process procedure concerning the invention the mobile terminal 10 is to carry out.

In the outset, the mobile terminal 10 moves a subnet wherein the L3 processing section 12 receives network information from a router arranged in a moved-in subnet through the L1/L2 processing section 11. Then, a care of address CoA effective in the relevant subnet is generated from the network information received by the L3 processing section 12, and the received network information is compared with the network information of the before-connected subnet currently in storage, thereby detecting whether moved or not (step S11). This movement detecting process can be implemented by the mobile IP processing section 14.

Incidentally, the other method to detect the movement may be used in the step S11 besides the above method.

Then, the mobile IP processing section 14 determines whether there is movement between subnets, as a result of the movement detecting process (step S11) from the L3 processing section 12 (step S12).

Incidentally, the start condition for movement detection (S11) may use, besides the above method, the lower layer, i.e. starting a handover process to be made by the L1/L2 processing section 11 or complete trigger. On this occasion, there is a need to connect between the L1/L2 processing section 11 and the mobile IP processing section 14.

Next, in the case a movement is detected but the subnet is unchanged, i.e. the newly acquired network information is the same as the one acquired before, the process returns to the step S11.

On the other hand, in the case movement is across the subnet, it is determined whether the moved-in subnet is within the same domain or not through the use of a domain ID, prefix information or authentication proceeding to be acquired from network information or the like (step S13). If within the same domain, the mobile IP processing section 14 registers to the home agent apparatus 50-1 a new care of address CoA-M acquired in the subnet and a home address HoA-M effective in the domain network 1 (step S14).

Incidentally, the registration process to be carried out by the mobile IP processing section 14 includes an operation to send a packet including a registration request message defined under the mobile IP protocol (e.g. binding update message 1000 shown in FIG. 21) to the home agent apparatus 50-1 (A1) and an operation to receive a packet including an effective registration acknowledge message (e.g. binding acknowledge message 1010 shown in FIG. 22) from the home agent apparatus 50-1 (A2) so that the mobile IP processing section 14 can correctly complete the process. The binding update message 1000 and binding acknowledge message 1010 describes, in a mobility option, the care of address CoA-M and home address HoA-M, which is to be notified to the home agent apparatus 50-1.

Meanwhile, the mobile terminal 10 may determine whether a moved-in subnet is in a different domain network (step S13), depending upon a presence or absence of a change of a link layer or communication media in actual use for communications in the case having different link layers or communication medias as in FIG. 5. Namely, where the mobile terminal 10 has a configuration shown in FIG. 5 and the L1/L2 processing section 16 is to connect with an access network under the domination of a domain network different from that of the L1/L2 processing section 11, it is possible to detect a movement to a different subnet and a movement to a different domain network simultaneously at a time that the destination of transfer, the L3 processing section 12 is to send and receive, is changed from the L1/L2 processing section 11 to the L1/L2 processing section 16.

Incidentally, the above explanation exemplified the network 1 that is the jurisdiction domain by the main home agent apparatus 50-1. However, the movement within the same domain network, in another domain 2 or 3, can be made by a similar process excepting only in that the home agent apparatus as a destination of registration is changed to the home agent 50-2 or 50-3.

Next explained is an operation at a time that the mobile terminal 10 moves between different domain networks, by taking an example of movement from domain 1 to 2, with using FIGS. 2 and 10.

The mobile IP processing section 14 recognizes that the mobile terminal 10 in step S13 is on a domain different in moved-in subnet, the mobile IP processing section 14 acquires a home address HoA-1 effective on the domain network 2 (step S15), and registers it, together with the care of address CoA-1 acquired before, to the home agent apparatus 50-2 arranged in the domain network 2 (step S16).

Then, the home agent registering section 19 registers a main home address HoA-M and a home address HoA-1 acquired in the domain 2 to the main home agent apparatus 50-1 (step S17).

At this time, the home domain storing section 17 may store a binding update list for managing registration information for the main home agent apparatus 50-1, or the home agent registering section 19 may adds and updates an entry representative of a correspondence between a main home address HoA-M and a sub-home address HoA-1 to the binding update list held by the mobile IP processing section 14. This binding update list takes a form as shown in FIG. 18, comprising at least an entry 170 for the home agent apparatus 50-2 (HA-1) in the domain 2 and an entry 180 for the main home agent apparatus 50-1 (M-HA) in the domain 1 (home domain).

Incidentally, the registration to each home agent apparatus 50 in step S16 and step S17 includes an operation to send a registration request message similarly to the registration process in the step S14 and an operation to receive an effective acknowledge message from the home agent apparatus 50 so that the mobile IP processing section 14 can correctly complete the process. Meanwhile, the home agent registering section 19 may independently generate and send a registration request message complying with the mobile IP protocol, or may make a request for generating and sending a registration request message to the mobile IP processing section 14.

Herein, the mobile IP processing section 14 may send a registration request message destined for the main home agent apparatus 50-1, by way of the home agent apparatus 50-2 in the belonging domain. On this occasion, a reverse tunnel is applied to between the mobile terminal 10 and the home agent apparatus 50-2. Also, at this time, the source address of the registration request message is a home address assigned in the belonging domain. Contrary to this, although the main home agent apparatus 50-1 sends a registration acknowledge message to a home address of mobile terminal 10 in the belonging domain, the registration acknowledge message is proxy-received by the home agent apparatus 50-2 and tunnel-transferred destined for the care of address CoA-1 of the mobile terminal 10.

As described above, the mobile terminal 10 belongs to at least one home domain network 1, to have a main home address HoA-M effective on the home domain network 1. The mobile terminal 10 can previously specify a home domain network or a main home agent apparatus, and store the information or main home address thereof to the home domain storing section 17. However, as described before, the main home agent selecting section 18 preferably acquires a home agent list as shown in FIG. 15 from the access point apparatus 60 or home agent information providing server 70, to select an optimal one therefrom. The home agent list acquired by the main home agent selecting section 18 is previously stored in the home domain storing section 17, whereby selection is made as required on the basis of a preference 142 in the home agent list or belonging frequency to each domain network or randomly.

The selecting method is explained below.

In the outset, the main home agent selecting section 18 previously monitors/measures a time or a number of times of stays in each domain network, access packet amount and the like. The totalized value thereof, while entered together in the home agent list, is stored to the home domain storing section 17. The main agent selecting section 18, when stay time reaches a predetermined time, takes the domain network belonged at that time as a home domain network. The main home agent selecting section 18 newly selects, as a main home agent apparatus, a home agent apparatus having the highest preference 142 computed in respect of load or remaining resource from the home agent apparatuses existing in that domain network. Incidentally, there is no need to use a home agent list as a destination of storage of the saying time totalized value. In such a case, newly acquired is a list of the home agent apparatus belonging to the domain selected as a home domain or otherwise extracted is an entry fallen under the home domain information (prefix, etc) selected from an already acquired home agent list, whereby a main home agent apparatus can be selected.

Then, the main home agent selecting section 18 makes a request for registering a home address to a DNS that manages the address of that domain network through the mobile IP processing section 14.

As in the above, the mobile terminal of the invention, upon roaming the domain network, carries out a binding registration to a main home agent apparatus 50-1 in a home domain network, by taking a set of a main home address complying with the mobile IP protocol and a sub-home address on a belonging domain network. Due to this, the communication data from an external terminal, because of transferred relayed through the main home agent apparatus and the sub-home agent apparatus, can be received even during roaming between the domain networks different in service form. Meanwhile, because the notification on the fact of movement to each home agent apparatus is from the mobile terminal, there is no need for the home agent apparatuses of the domain networks different in service form to carry out while making a mutual adjustment.

Furthermore, because the mobile terminal can select a home domain network and main home agent apparatus, it is possible to take a domain network capable of receiving a best suited service at a moving point as a home domain network, thus improving user's convenience. This provides a great effect particularly where roaming between the domain networks different in service form.

Next explained is a configuration and basic operation of the home agent apparatus 50.

Figure 6:
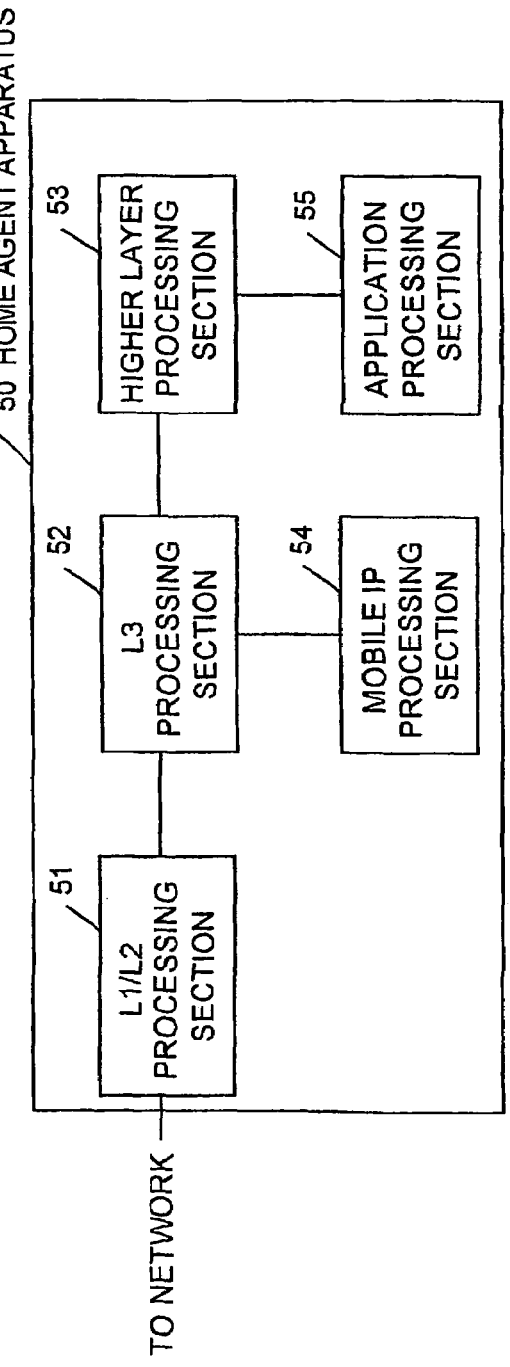
FIG. 6 is a diagram showing a first configuration of a home agent apparatus according to embodiment 1 of the invention.
Figure 7:
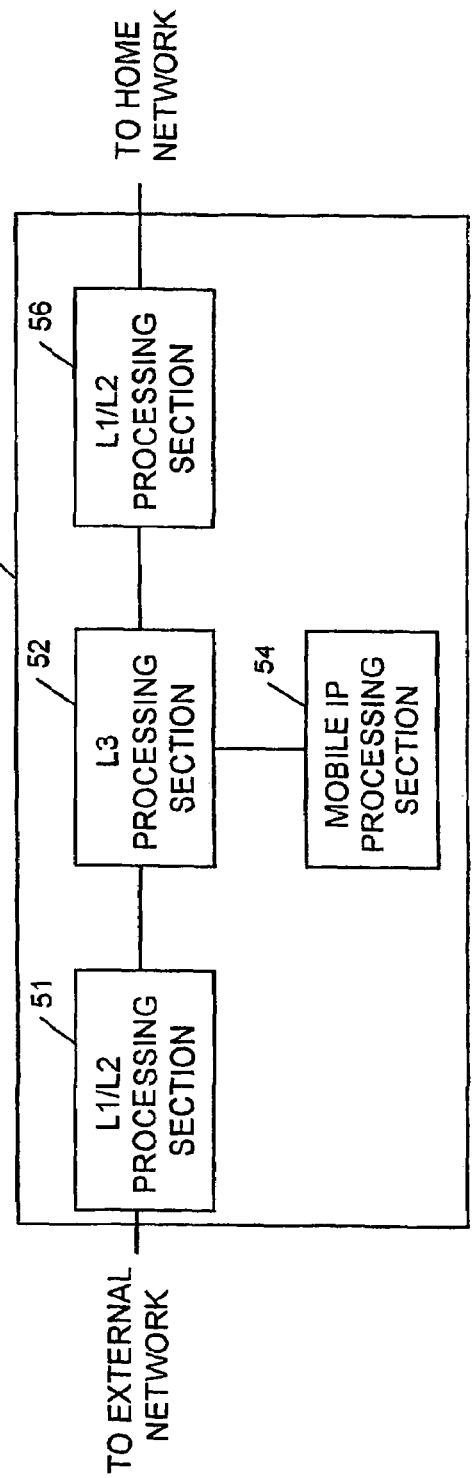
FIG. 7 is a diagram showing a second configuration of a home agent apparatus according to embodiment 1 of the invention.

FIGS. 6 and 7 are configuration diagrams of the home agent apparatus 50. An L1/L2 processing section 51, 56 is to carry out a physical layer process/data-link layer process, an L3 processing section 52 is to carry out a network layer process, a higher layer processing section 53 is to carry out a process on a higher layer, such as TCP, UDP or the like, a mobile IP processing section 54 is to carry out a mobility management of mobile terminals, and an application processing section 55 is to carry out control of applications.

Incidentally, although FIG. 7 shows only two of L1/L2 processing sections 51, 56 to connect to a network, the configuration may comprise much more L1/L2 processing sections. The present invention is not to limit the provision number thereof. Even in the case of providing three or more L1/L2 processing sections, it is possible to realize the operation thereof by a similar configuration and a procedure to be explained below.

The basic operation of the home agent apparatus 50 configured as above is explained below.

FIG. 11 is a process procedure to be executed by the mobile IP processing section 54 of the home agent apparatus 50.

In the outset, the mobile IP processing section 54 carries out a location management on the mobile terminal 10 according to a mobile IP protocol. Namely, the mobile IP processing section 54 receives a packet from the mobile terminal 10 by way of the L1/L2 processing section 51/L3 processing section 52 (step S51), and determines whether or not an effective registration request message is included in a packet thereof (step s52). In the case an effective registration request message is included in the packet, the mobile IP processing section 54 carries out a binding cache update process (step S53).

Figure 17:
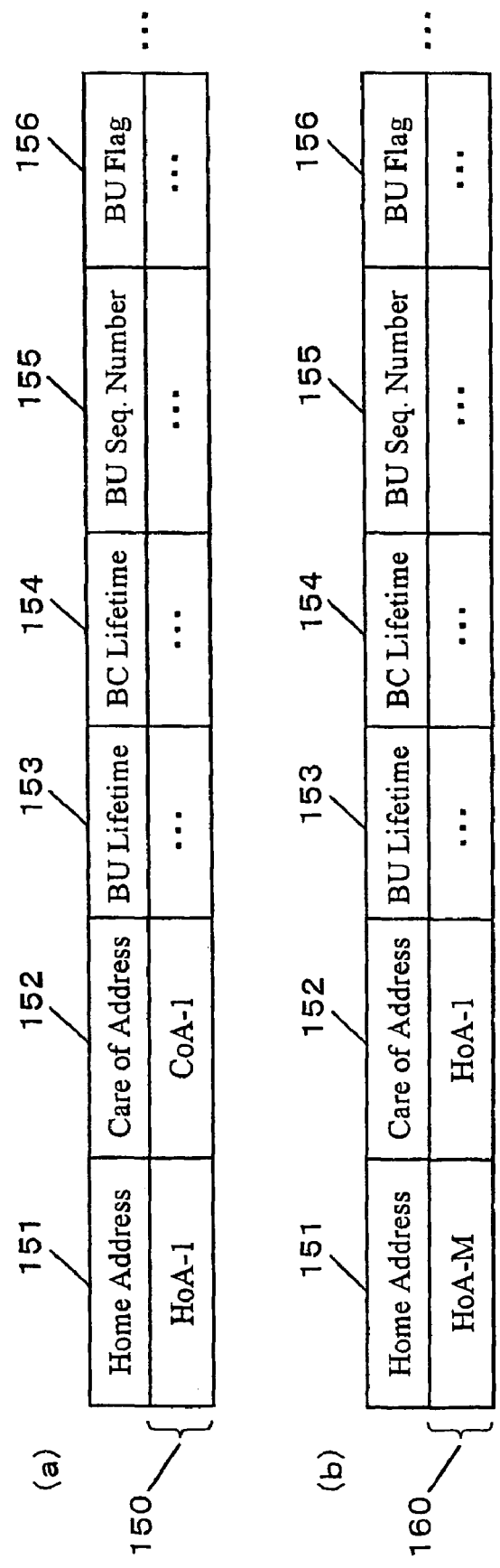
FIG. 17(*a*) is a figure showing an example of a binding cache to be managed by the conventional home agent apparatus.

In the binding cache updating (step S53), the following process is carried out. In the case that there is an entry of the mobile terminal 10 in a binding cache under management of the home agent apparatus 50, the content thereof is updated. In the case there is no entry, an entry is newly created by using the information included in a registration request message, e.g. a mobile terminal 10 home address, care of address, lifetime and so on. Herein, explained is the data configuration of the binding cache. FIG. 17(*a*) shows a conventional binding cache entry 150 while FIG. 17(*b*) shows a binding cache entry 160 to be generated by the invention.

The mobile IP processing section 54 describe fields, i.e. required items including mobile terminal 10 home address 151 and care of address 152, a registration request lifetime (BU lifetime) 153, a lifetime of this entry (BC lifetime) 154, a registration request message sequence number (BU seq. number) 155, and a registration request flag (BU flag) 156. The conventional entry 150 describes a home address (HoA-1) in the home address field 151 and an address of a subnet (CoA-1) under accessing in the care of address field 152. On the contrary, the entry 160 of the invention is different in that describing a main home address (HoA-M) in the home address field 151 and a home address (HoA-1) of an accessed domain network in the care of address field 152. Furthermore, the feature of the invention lies in that the mobile IP processing section 54 is not required to add any new process at all in respect of the description content to the binding cache entry, i.e. in being able to use, as it is, a home agent apparatus 50 as defined under a standard mobile IP.

Then, after the mobile IP processing section 54 completes to update the binding cache, the mobile IP processing section 54 sends a registration acknowledge message packet including a success/failure on binding cache update to the mobile terminal 10 through the L3 processing section 52/L1/L2 processing section 51 (step S54).

On the other hand, in the case that an effective registration request message is not included in the received packet, the mobile IP processing section 54 carries out, in the L3 processing section 52, a usual IP layer process not including an IP procedure (step S57).

Meanwhile, in step 51, in the case that the packet received by the mobile IP processing section 54 is not from the mobile terminal 10, it is determined whether destined for the mobile terminal 10 or not (step S55).

In the case that it is a packet destined for the mobile terminal 10, the mobile IP processing section 54 searches the binding cache for an entry concerning the mobile terminal 10 through a home address HoA as a key. In the case there is an entry, a received packet is encapsulated with an IP header having a registered care of address as a destination and sent to the L3 processing section 52 and the L1/L2 processing section 51 in the order. Meanwhile, in the case there is no entry, the received packet is routed to a home network connected to the home agent apparatus 50 (step S56). For example, where the home agent apparatus 50 is in a configuration of FIG. 6, sending onto network is in the order of the L3 processing section 52 and the L1/L2 processing section 51. Where in a configuration of FIG. 7, sending to home network is done in the order of the L3 processing section 52 and the L1/L2 processing section. 56.

On the other hand, in the case that not a packet destined for a home address of the mobile terminal 10, the process moves to step S57.

Meanwhile, where the home agent apparatus 50 is in a configuration shown in FIG. 6, when the L3 processing section 52 in step S55 determines that the packet received by the mobile IP processing section 54 is not destined for the mobile terminal 10 but for the home agent apparatus 50, it is transferred to the application processing section 55 via the higher layer processing section 53 thus being subjected to an application process. Furthermore, in the case that not destined for the home agent apparatus 50, re-sending to network is done again via the L1/L2 processing section 51.

Meanwhile, in the case that the home agent apparatus 50 has a plurality of physical links as in FIG. 7, the received packet is transferred to either of the L1/L2 processing section 51 or 56 on the basis of a routing table under management of the L3 processing section 52, again being sent onto the network.

Incidentally, in the configuration shown in FIG. 7, the configuration may further comprise a higher layer processing section 53 connected to the L3 processing section 52 and an application processing section 55 connected to the higher layer processing section 53. In such a case, the processing thereof can be realized by compositely effecting the operations as explained related to the FIGS. 6 and 7. Namely, in case the L3 processing section 52 determines a packet destined for itself, it is transferred to the application processing section 55 via the higher layer processing section 53. Meanwhile, in case the received packet is determined not destined for the home address HoA of the accommodated mobile terminal 10 nor a packet destined for itself, the received packet is transferred to either of the L1/L2 processing section 51 or 56 on the basis of a routing table under management of the L3 processing section 52, again being sent onto the network.

As in the above, because the home agent apparatus 50 registers the location information from the mobile terminal 10 to the binding cache so that the packet destined for a mobile terminal received later can be sent on the basis of the binding cache registered, it is possible to correctly transfer data destined for a mobile terminal.

Next explained is a configuration and operation of the access point apparatus 60.

Figure 8:
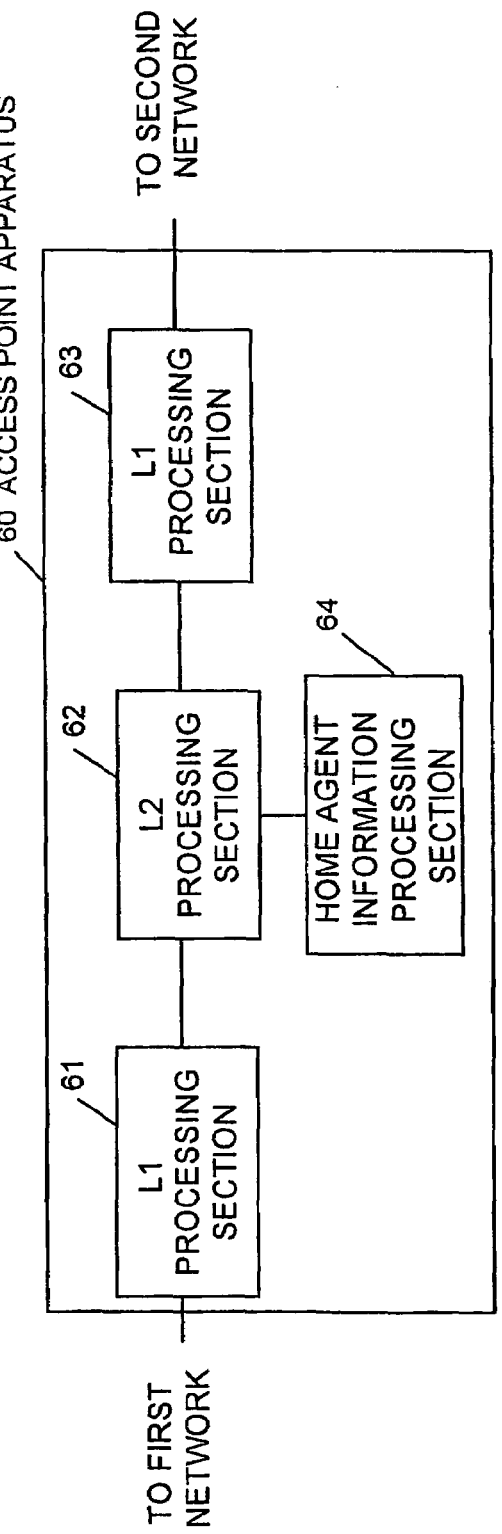
FIG. 8 is a diagram showing a first configuration of an access point apparatus according to embodiment 1 of the invention.
Figure 9:
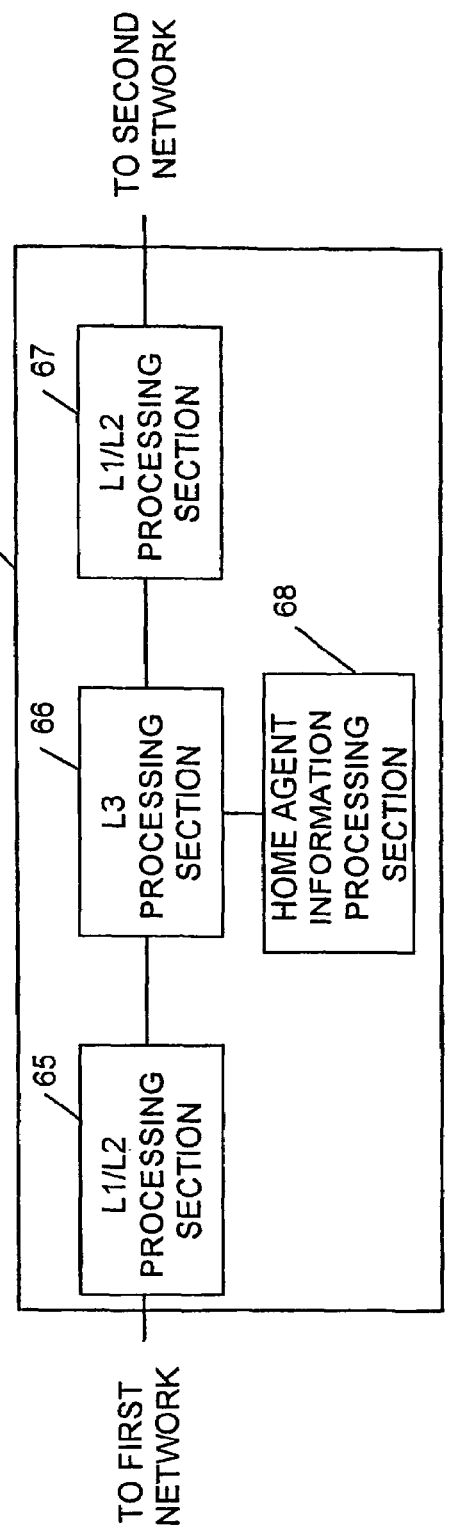
FIG. 9 is a diagram showing a second configuration of an access point apparatus according to embodiment 1 of the invention.

FIG. 8 is a configuration in the case the access point apparatus 60 functions as a bridge while FIG. 9 is a configuration in the case the access point apparatus 60 functions as a router. Meanwhile, a first network is a network on a side the mobile terminal 10 is to be connected.

In FIG. 8, an L1 processing section 61, 63 is to carry out a physical layer process, an L2 processing section 62 is to carry out a data-link layer process of a sending/receiving packet and a packet relay (bridging) at between the L1 processing sections 61, 63, a home agent information processing section 64 is to acquire and provide home agent information by the use of an IP packet thus carrying out a higher layer process at a layer 3 (L3) or higher. Incidentally, concerning a higher layer process, it is possible to provide a higher layer processing means for a higher layer process at L3 or higher, in a position to the L2 processing section 62.

FIG. 9 is a second configuration diagram of the access point apparatus 60. An L1/L2 processing section 65, 67 is to carry out a physical layer process and data-link layer process, an L3 processing section 66 is to carry out a network layer process on a sending/receiving packet and a packet relay (routing) at between the L1/L2 processing sections 65, 68, a home agent information processing section 68 is to acquire and provide home agent information by the use of an IP packet thus carrying out a higher layer process at a layer 4 (L4) or higher. Incidentally, concerning a higher layer process, it is possible to provide a higher layer processing means for a higher layer process at L4 or higher, in a position to the L3 processing section 66.

The operation of the access point apparatus 60 configured as above is explained below.

FIG. 13 shows a process procedure for the access point apparatus 60 to acquire home agent information and update holding information at a regular interval.

In FIG. 13, the home agent information processing section 64, 68 always checks whether in information update timing or not (step S64). In the case in information update timing, an inquiry packet is generated and sent to the second network by way of the L2 processing section 62/L1 processing section 63 or by way of the L3 processing section 66/L1/L2 processing section 67 (step S65). The destination on this occasion may be any cast address for the home agent apparatus 50 as regulated under the mobile IP protocol or a unicast address for the home agent apparatus 50. Incidentally, the inquiry packet may be sent, as required, to the first network or to the first and second networks.

Otherwise, the home agent information processing section 64, 68 may broadcast to the destinations by designating the network entirety, or may designate a unicast address, destined for the home agent apparatus, generated from home prefix information previously stored. Otherwise, unicast may be made to the home agent apparatus 50. The inquiry packet may be in compliance with the dynamic home address discovery regulated under the, mobile IP protocol. Incidentally, the timing of information update may be controlled by using a timer or manually.

Then, the home agent information processing section 64, 68 receives an effective a knowledge packet from at least one or more home agent apparatuses 50 via the L1 processing section 63/L2 processing section 62 or via the L1/L2 processing section 67/L3 processing section 66, and stores/holds the content thereof (step S66). The home agent information processing section 64, 68 acquires information about the home agent apparatus shown in FIG. 15 from the one or more home agent apparatuses 50, thus creating entries 110 to 130 concerning the home agent apparatuses 50.

Incidentally, the information stored/held may be held at least up to the next information update timing, and it after update may be preparatorily held for a constant period of time.

As described above, the access point apparatus 60 regularly acquires information about the home agent apparatus 50 having a jurisdiction over a domain network for connection, thereby holding the up-to-date home agent information.

Meanwhile, the access point apparatus 60 provides home agent information to the mobile terminal 10.

Next explained is a process procedure for the home agent information processing section 64 to provide home agent information.

FIG. 12(a) shows a process procedure for the access point apparatus 60 to provide home agent information in response to a request from the mobile terminal 10. FIG. 12(b) shows a process procedure for the access point apparatus 60 to regularly broadcast or multicast home agent information.

In FIG. 12(a), the home agent information processing section 64, 68 checks for an inquiry signal or packet reception from the mobile terminal 10 via the L1 processing section 61/L2 processing section 62 or via the L1/L2 processing section 65/L3 processing section 66 (step S61).

The home agent information processing section 64, 68, when receiving these inquiry signals, reads out the stored/held information about a home agent apparatus and creates an reply signal or packet (step S62).

Then, the home agent information processing section 64, 68 sends these reply signals or packets to the mobile terminal 10 via the Lo processing section 62/L1 processing section 61 or the L3 processing section 66/L1/L2 processing section 65 (step S63).

Meanwhile, in FIG. 12(b), the home agent information processing section 64, 68 determines whether it is in timing to provide information to the mobile terminal 10 or not (step S71) In the case of timing to provide in-formation, the information about a home agent apparatus stored/held before is read out to generate an reply signal or packet (step S72).

Then, the home agent information processing section 64, 68 carries out a broadcast to the first network accommodating the mobile terminal 10, via the L2 processing section 62/L1 processing section 61 or the L3 processing section 66/L1/L2 processing section 65 (step S73). Herein, information providing timing may be controlled by the use of a timer or manually.

As described above, the access point apparatus of the invention can provide home agent information in response to a request by a mobile terminal or regularly. This allows the mobile terminal to acquire home agent information from an access point apparatus located at a shortest distance, hence making it possible to reduce the process time for sending control data upon starting communications.

Next explained is a configuration and operation of the home agent information providing server 70.

Figure 16:
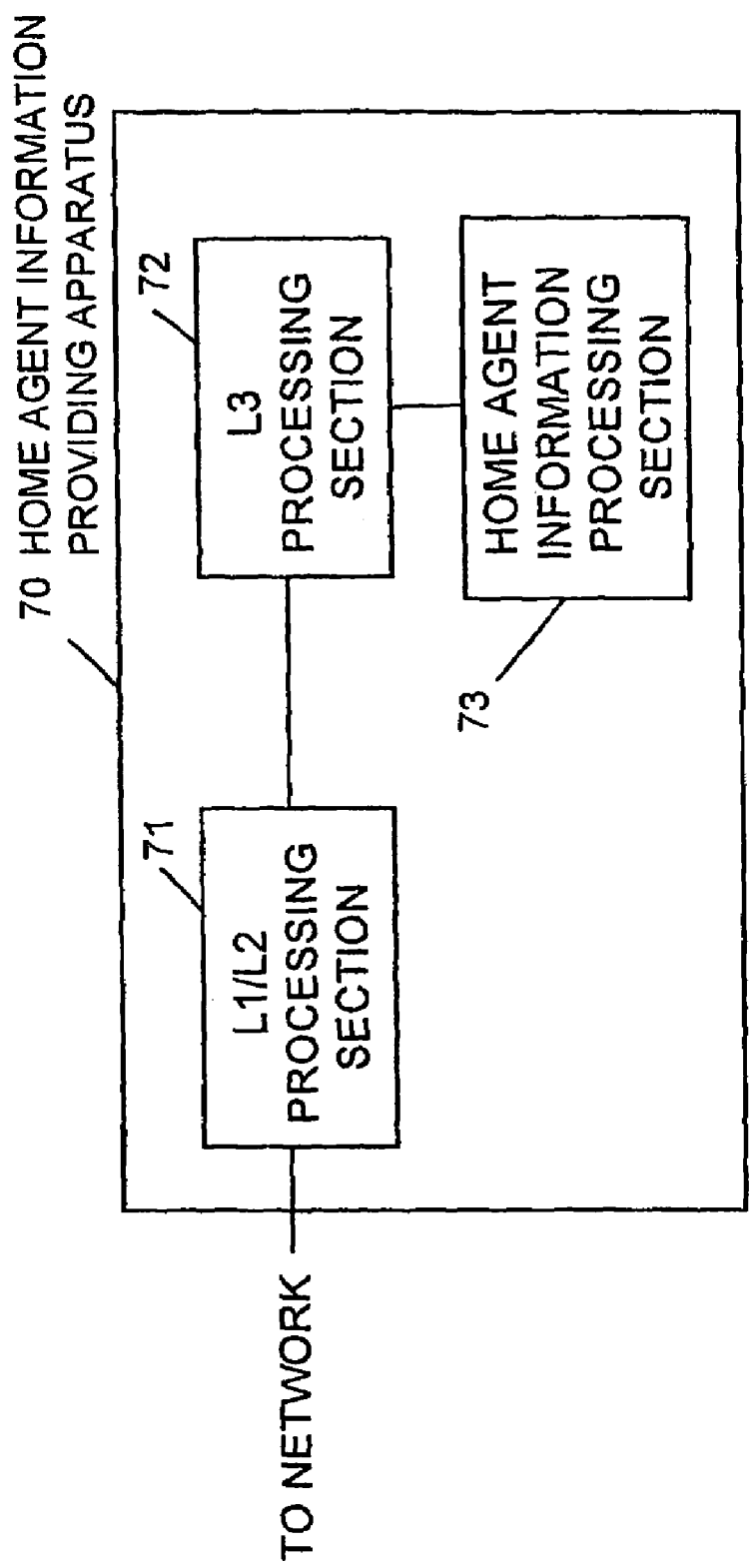
FIG. 16 is a figure showing a configuration of a home agent information providing apparatus according to embodiment 1 of the invention.

FIG. 16 is a configuration diagram of the home agent information providing server 70. An L1/L2 processing section 71 is to carry out a physical layer and data-link layer process, an L3 processing layer 72 is to carry out a network layer process, and a home agent information processing section 73 is to gather/store home agent information about a home agent apparatus 50 for managing a connected domain network thus providing stored home agent information to the mobile terminal 10.

The operation of the home agent information providing server 70 configured as above is explained below.

The home agent information processing section 73 makes a similar operation to the home agent information processing section 64, 68 of the access point apparatus 60.

Namely, the home agent information processing section 73 regularly acquires information about a home agent apparatus 50 having a jurisdiction over a connected domain network, by the process shown in FIG. 13. Also, by the process shown in FIGS. 12(a) and (b), home agent information is provided to the mobile terminal 10 regularly or in response to a request from the mobile terminal 10.

As described above, the home agent information providing server 70 of the invention collectively manages the information about a home agent apparatus. Consequently, there is no need of mounting a function for each access point apparatus 60 to gather home agent information and provide it to a mobile terminal, thus reducing the system overall cost.

Incidentally, even when the mobile terminal 10 roams about a plurality of home agent apparatuses 50 arranged within the same domain, it can similarly provide home agent information to the mobile terminal 10 in response to a request from the mobile terminal.

As described above, in the present embodiment, when the mobile terminal is assigned with a different home address in a moved-in domain network, the main home agent manages a correspondence to a main home address. Accordingly, it is possible to support a change of home address caused upon roaming between mobile communication networks in a manner the external terminal is conscious thereof.

Furthermore, because the mobile terminal is allowed to desirably select a main home agent, it is possible to flexibly cope with a domain network different in service form.

Also, because of registration of a home address to a main home agent instead of a care of address as in the conventional mobile IP, the frequency of location registration can be reduced in the main home agent, making it possible to reduce network load.

Embodiment 2

Figure 20:
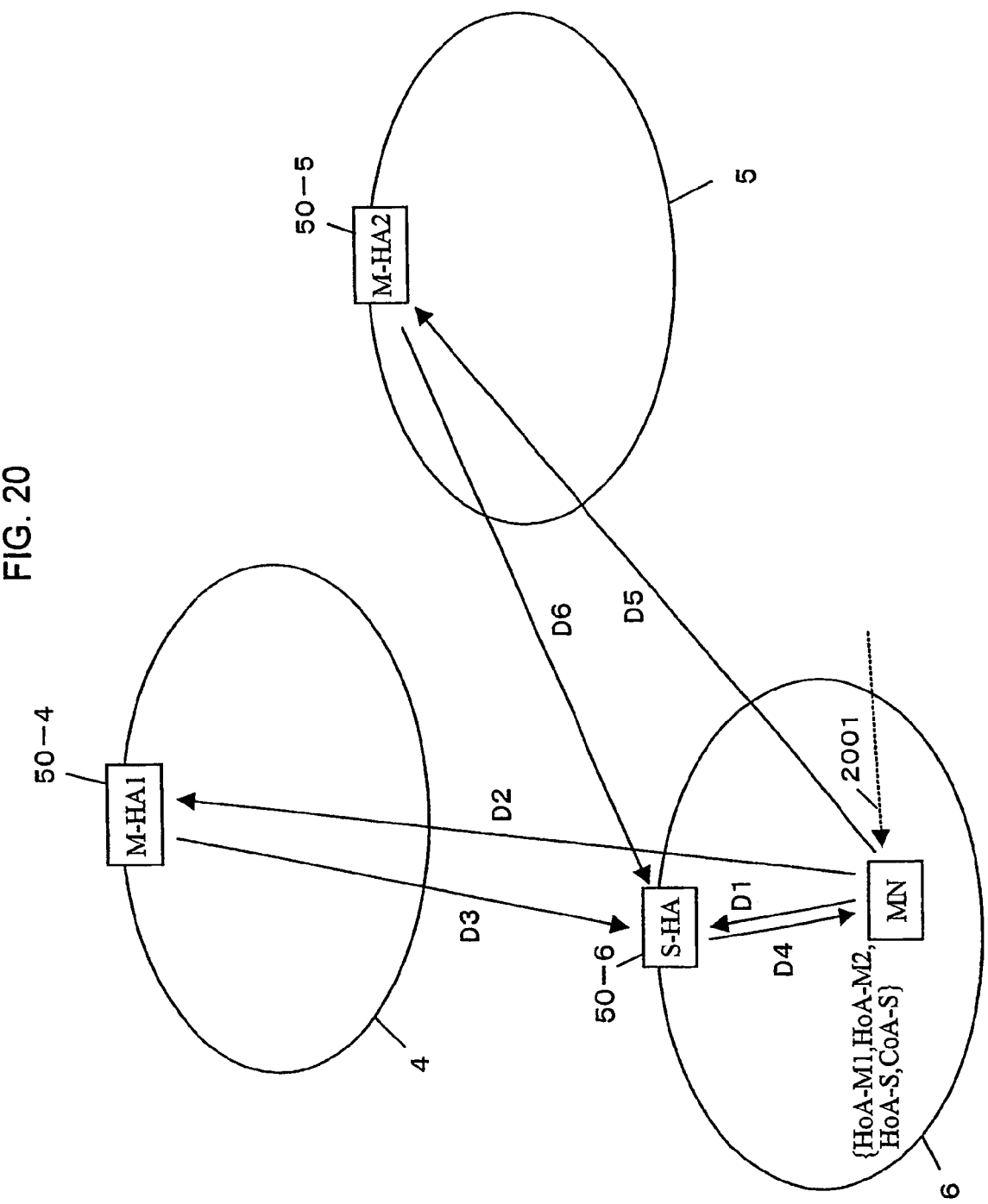
FIG. 20 is a diagram showing a mobile communication system configuration according to embodiment 2 of the invention.
Figure 21:
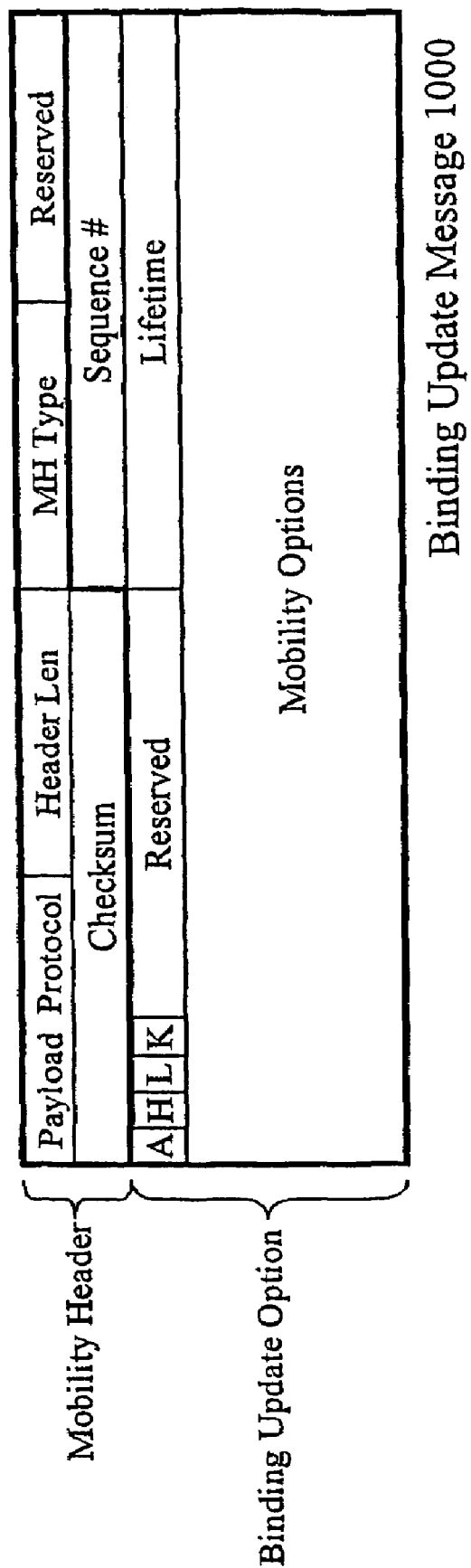
FIG. 21 is a figure showing a binding update message in a mobile IP according to embodiment 1 of the invention.
Figure 22:
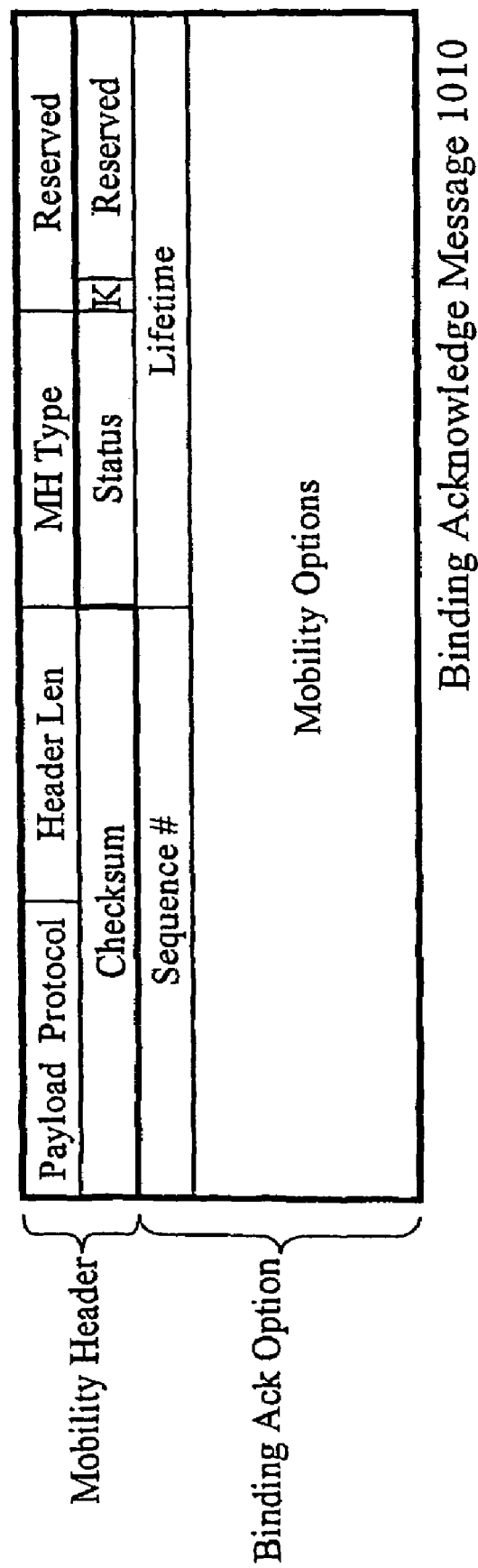
FIG. 22 is a figure showing a binding acknowledge message in a mobile IP according to embodiment 1 of the invention.
Figure 23:
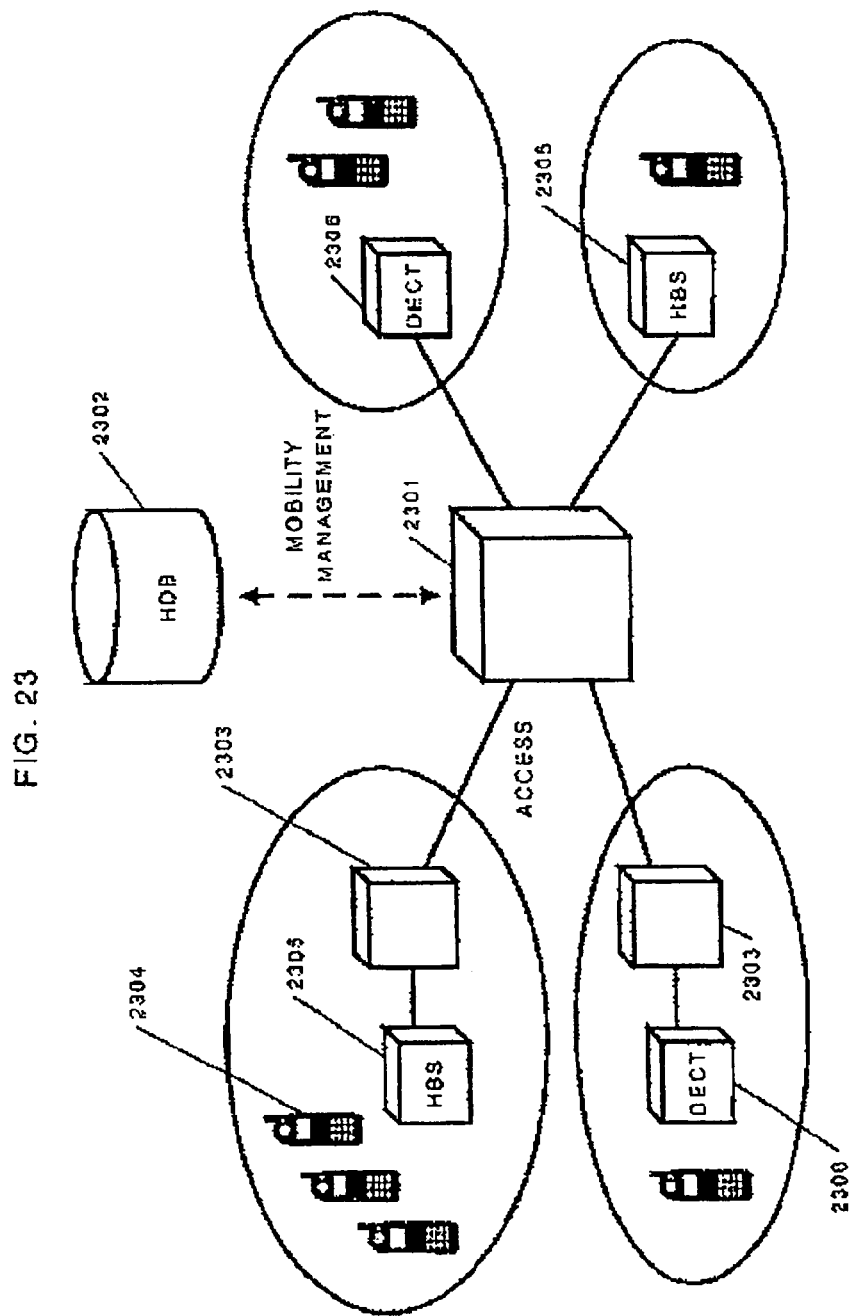
FIG. 23 is a configuration diagram of a conventional mobile communication system.

FIG. 20 shows a network configuration of a mobile communication system in embodiment 2 of the invention.

This embodiment is different from embodiment 1 in that providing a plurality of main home agent apparatuses (main home agent apparatuses 50-4, 50-5). Besides, the apparatuses configuring the mobile communication system are the same as the apparatuses explained in embodiment 1.

The mobile communication method in the mobile communication system thus configured is explained below.

A mobile terminal 10 holds HoA-M1 and HoA-M2 (respectively corresponding to the main home agent apparatuses 50-4 and 50-5) as main home addresses. In this case, the mobile terminal 10 registers (D1, D4) a sub-home address HoA-S and care of address CoA-S, acquired by accessing a moved-in domain network 6, to a sub-home agent apparatus 50-6 of the domain network 6. Together with this, the mobile terminal 10 registers (D2, D3, D4) a main home address HoA-M1 and sub-home address HOA-S of the domain network 6 to the main home agent apparatus 50-4, and registers a sub-home address HoA-S same as the main home address HoA-M2 to the main home agent apparatus 50-5.

Due to this, the communication data destined for a mobile terminal 10 sent to the main home address HoA-M1 or HoA-M2 is transferred to a sub-home agent 50-6 and delivered from the sub-home agent 50-6 to the mobile terminal 10.

By thus having a plurality of main home addresses, for example a main home address for private use can be accommodated in a home agent apparatus mounted on a home gateway in an own house while a main home address for business use can be accommodated in a gateway in a company. Due to this, even in the case that accommodated in a home agent apparatus offered by the Internet provider having been accessed, for example, at a place upon business trip, it is possible to secure incoming calls destined for the main home address for private use as well as incoming calls destined for the main home address for business use.

INDUSTRIAL APPLICABILITY

As described above, the present invention is useful for the mobile communications with roaming between the mobile communication networks different in service form on a carrier-by-carrier basis, and suited in flexibly coping with an incoming call from the external by the use of a representative home address, on the Internet as a distributed network.

The invention claimed is:

1. A method of managing mobility of a mobile terminal on at least one domain network including a plurality of subnets, each subnet having at least one home agent apparatus, comprising:
    determining a home agent for the mobile terminal to perform location management of the mobile terminal, wherein the mobile terminal has communications with an access point apparatus arranged on one of the plurality of subnets and moves between the plurality of subnets or between the at least one domain network which are different in service form;
    registering a main home address by the mobile terminal provided from a main home agent apparatus to a server for managing an address of the mobile terminal to have a connection to the at least one domain network; and
    registering a sub-home address to the main home agent apparatus, as a care of address, for use on an other domain network different in service form, when the mobile terminal moves to the other domain network, wherein the sub-home address is registered as the care of address for use on the other domain network for a specified time period;
    measuring, by the mobile terminal, a composite time corresponding to the mobile terminal being on the other subnet;
    responsive to the mobile terminal moving to another subnet of the plurality of subnets for a threshold period, changing the main home agent apparatus to another one of the home agent apparatus;
    wherein the step of changing the main home agent includes changing the mobile terminal to the other one of the home agent apparatus, corresponding to the other subnet, when the composite time reaches the threshold period.

2. A method of managing mobility according to claim 1, wherein the mobile terminal previously stores information about a home agent apparatus to become a candidate for the main home agent apparatus.

3. A method of managing mobility according to claim 2, further comprising a step of acquiring by the mobile terminal the information about a home agent apparatus to become a candidate for the main home agent apparatus from the domain network.

4. A method of managing mobility according to claim 2, wherein, in the step of determining the home agent, the mobile terminal changes the main home agent apparatus based on the information about respective home agent apparatus.

5. A method of managing mobility according to claim 2, wherein, in the step of determining the home agent, the mobile terminal determines the main home agent apparatus from the information about respective home agent apparatus, based on a preference indicator of the information.

6. A method of managing mobility according to claim 2, wherein, in the step of determining the home agent, the mobile terminal determines the main home agent apparatus from the information about respective home agent apparatus, based on an access frequency to the respective home agent apparatus.

7. A method of managing mobility according to claim 2, further comprising making a request for a registration to a respective home agent apparatus arranged in a domain network to be connected through one or more link layers, at least one of the link layers being placed in an operational state to acquire an IP address possessed by the mobile terminal, wherein the step of registering the sub-home address is performed when the registration request is granted by the respective home agent apparatus.

8. A method of managing mobility according to claim 1, further comprising a step of acquiring by the mobile terminal the information about a home agent apparatus to become a candidate for the main home agent apparatus from the domain network.

9. A method of managing mobility according to claim 8, wherein, in the step of determining the home agent, the mobile terminal changes the main home agent apparatus based on the information about respective home agent apparatus.

10. A method of managing mobility according to claim 9, further comprising making a request for a registration to a respective home agent apparatus arranged in a domain network to be connected through one or more link layers, at least one of the link layers being placed in an operational state to acquire an IP address possessed by the mobile terminal, wherein the step of registering the sub-home address is performed when the registration request is granted by the respective home agent apparatus.

11. A method of managing mobility according to claim 8, wherein, in the step of determining the home agent, the mobile terminal determines the main home agent apparatus from the information about respective home agent apparatus, based on a preference indicator of the information.

12. A method of managing mobility according to claim 3, wherein, in the step of determining the home agent, the mobile terminal determines the main home agent apparatus from the information about respective home agent apparatus, based on an access frequency to the respective home agent apparatus.

13. A method of managing mobility according to claim 8, further comprising making a request for a registration to a respective home agent apparatus arranged in a domain network to be connected through one or more link layers, at least one of the link layers being placed in an operational state to acquire an IP address possessed by the mobile terminal, wherein the step of registering the sub-home address is performed when the registration request is granted by the respective home agent apparatus.

14. A method of managing mobility according to claim 1, wherein, in the step of determining the home agent, the mobile terminal changes the main home agent apparatus based on the information about respective home agent apparatus.

15. A method of managing mobility according to claim 14, further comprising making a request for a registration to a respective home agent apparatus arranged in a domain network to be connected through one or more link layers, at least one of the link layers being placed in an operational state to acquire an IP address possessed by the mobile terminal, wherein the step of registering the sub-home address is performed when the registration request is granted by the respective home agent apparatus.

16. A method of managing mobility according to claim 1, wherein, in the step of determining the home agent, the mobile terminal determines the main home agent apparatus from the information about respective home agent apparatus, based on a preference indicator of the information.

17. A method of managing mobility according to claim 1, wherein, in the step of determining the home agent, the mobile terminal determines the main home agent apparatus from the information about respective home agent apparatus, based on an access frequency to the respective home agent apparatus.

18. A method of managing mobility according to claim 17, further comprising making a request for a registration to a respective home agent apparatus arranged in a domain network to be connected through one or more link layers, at least one of the link layers being placed in an operational state to acquire an IP address possessed by the mobile terminal, wherein the step of registering the sub-home address is performed when the registration request is granted by the respective home agent apparatus.

19. A method of managing mobility according to claim 1, further comprising making a request for a registration to a respective home agent apparatus arranged in a domain network to be connected through one or more link layers, at least one of the link layers being placed in an operational state to acquire an IP address possessed by the mobile terminal, wherein the step of registering the sub-home address is performed when the registration request is granted by the respective home agent apparatus.

20. A mobile terminal for use with at least one domain network including a plurality of subnets comprising:
a main home agent selecting section for selecting a main home agent apparatus to request location management and making a request for registering a home address provided from the main home agent apparatus to a server for managing an address of the mobile terminal to be connected to the at least one domain network;
a mobile IP processing section for notifying, when the mobile terminal has moved to a domain network different in service form, a sub-home agent apparatus for requesting location management on the other domain network different in service form of a home address for use on the other domain network different in service form together with a care of address for use on a subnet of the other domain network different in service form, based on a mobile IP protocol, wherein the sub-home address is registered as the care of address for use on the other domain network for a Specified time period;
a home agent registering section for notifying the main home agent apparatus of the main home address and a sub-home address for use on the other domain network different in service form,
wherein, responsive to the mobile terminal moving to another subnet of the plurality of subnets for a threshold period, the main home agent apparatus is changed to another one of the home agent apparatus; and
the mobile terminal measures a composite time corresponding to the mobile terminal being on the other subnet, and when the composite time reaches the threshold period, the mobile terminal changes to the other one of the home agent apparatus, corresponding to the other subnet.

21. A mobile terminal according to claim 20, further comprising a home domain storing section for storing a home agent list as information about respective home agent apparatus to become a candidate for the main home agent apparatus, wherein the main home agent selecting section selects the main home agent apparatus from the home agent list.

22. A mobile terminal according to claim 21, wherein the main home agent selecting section acquires information about the respective home agent apparatus from the domain network and stores the information about the respective home agent apparatus to the home domain storing section.

23. A mobile terminal according to claim 22, wherein the main home agent selecting section changes the main home agent apparatus based on information from the home agent list stored in the home domain storing section.

24. A mobile terminal according to claim 22, wherein the main home agent selecting section selects the main home agent apparatus from the home agent list stored in the home domain storing section, on the basis of a priority of information about the respective home agent apparatus.

25. A mobile terminal according to claim 22, wherein the main home agent selecting section selects, as the main home agent apparatus, one of the respective home agent apparatus having an access frequency equal to or greater than a predetermined value from the home agent list stored in the home domain storing section.

26. A mobile terminal according to claim 22, wherein the home agent registering section makes a request for registration to a sub-home agent apparatus through one or more link layers, at least one of the link layers being placed in an operational state so that when receiving a grant for the registration request by the sub-home agent apparatus, a notification of a sub-home address to the main home agent apparatus is started.

27. A mobile terminal according to claim 21, wherein the main home agent selecting section changes the main home agent apparatus based on information from the home agent list stored in the home domain storing section.

28. A mobile terminal according to claim 27, wherein the home agent registering section makes a request for registration to a sub-home agent apparatus through one or more link layers, at least one of the link layers being placed in an operational state so that when receiving a grant for the registration request by the sub-home agent apparatus, a notification of a sub-home address to the main home agent apparatus is started.

29. A mobile terminal according to claim 21, wherein the main home agent selecting section selects, as the main home agent apparatus, one of the respective home agent apparatus having an access frequency equal to or greater than a predetermined value from the home agent list stored in the home domain storing section.

30. A mobile terminal according to claim 29, wherein the home agent registering section makes a request for registration to a sub-home agent apparatus through one or more link layers, at least one of the link layers being placed in an operational state so that when receiving a grant for the registration request by the sub-home agent apparatus, a notification of a sub-home address to the main home agent apparatus is started.

31. A mobile terminal according to claim 21, wherein the home agent registering section makes a request for registration to a sub-home agent apparatus through one or more link layers, at least one of the link layers being placed in an operational state so that when receiving a grant for the registration request by the sub-home agent apparatus, a notification of a sub-home address to the main home agent apparatus is started.

32. A mobile terminal according to claim 21, wherein the main home agent selecting section selects the main home agent apparatus from the home agent list stored in the home domain storing section, on the basis of a priority of information about a home agent apparatus.

33. A mobile terminal according to claim 32, wherein the home agent registering section makes a request for registration to a sub-home agent apparatus through one or more link layers, at least one of the link layers being placed in an operational state so that when receiving a grant for the registration request by the sub-home agent apparatus, a notification of a sub-home address to the main home agent apparatus is started.

34. A mobile terminal according to claim 20, wherein the home agent registering section makes a request for registration to a sub-home agent apparatus through one or more link layers, at least one of the link layers being placed in an operational state so that when receiving a grant for the registration request by the sub-home agent apparatus, a notification of a sub-home address to the main home agent apparatus is started.

35. A mobile terminal according to claim 20, wherein the mobile IP processing section, when receiving a multi-encapsulated packet, takes a source address described in an innermost header as a destination of registering location.

* * * * *

UNITED STATES PATENT AND TRADEMARK OFFICE
CERTIFICATE OF CORRECTION

| | | |
|---|---|---|
| PATENT NO. | : 7,299,044 B2 | Page 1 of 1 |
| APPLICATION NO. | : 10/501564 | |
| DATED | : November 20, 2007 | |
| INVENTOR(S) | : Ikeda et al. | |

It is certified that error appears in the above-identified patent and that said Letters Patent is hereby corrected as shown below:

On Page 2, item [56], References Cited: "WO WO 98 57515" should read --WO 98 57515--.

On Page 2, item [56], References Cited: "WO WO 01 41395 A" should read --WO 01 41395 A--.

On Page 2, item [56], References Cited: "WO WO0141395 A1" should read --WO 01 41395 A1--.

At Column 20, line 16, "domain network; and" should read --domain network;--.

At Column 20, lines 25-26, "being on the other subnet;" should read --being on another subnet; and--.

At Column 21, line 27, "claim 3," should read --claim 8--.

At Column 22, line 37, "Specified time period;" should read --specified time period; and--.

Signed and Sealed this

Sixth Day of May, 2008

JON W. DUDAS
*Director of the United States Patent and Trademark Office*